US005550746A

United States Patent [19]

Jacobs

[11] Patent Number: 5,550,746

[45] Date of Patent: Aug. 27, 1996

[54] METHOD AND APPARATUS FOR STORING AND SELECTIVELY RETRIEVING PRODUCT DATA BY CORRELATING CUSTOMER SELECTION CRITERIA WITH OPTIMUM PRODUCT DESIGNS BASED ON EMBEDDED EXPERT JUDGMENTS

[75] Inventor: Herbert H. Jacobs, LaJolla, Calif.

[73] Assignee: American Greetings Corporation, Cleveland, Ohio

[21] Appl. No.: 349,390

[22] Filed: Dec. 5, 1994

[51] Int. Cl.$^6$ .......... G06F 17/60; G06F 19/00

[52] U.S. Cl. .......... 364/479.01; 364/401; 395/54; 395/934

[58] Field of Search .......... 364/468, 478, 364/479, 401–403, 188, 189; 395/155–161, 600, 925, 934, 54

[56] References Cited

U.S. PATENT DOCUMENTS

| | | | |
|---|---|---|---|
| Re. 32,115 | 4/1986 | Lockwood et al. | 235/381 |
| Re. 33,316 | 8/1990 | Katsuta et al. | 364/521 |
| 2,089,563 | 8/1937 | Luhrs | 229/8 |
| 3,454,956 | 7/1969 | Icenbice, Jr. et al. | 346/104 |

(List continued on next page.)

FOREIGN PATENT DOCUMENTS

| | | |
|---|---|---|
| 1278862 | 5/1986 | Canada . |
| 2033966 | 1/1991 | Canada . |
| 2041298 | 4/1991 | Canada . |
| 79302164 | 10/1979 | European Pat. Off. . |
| 79104527 | 11/1979 | European Pat. Off. . |
| 83108181 | 8/1983 | European Pat. Off. . |
| 83306220 | 10/1983 | European Pat. Off. . |

(List continued on next page.)

OTHER PUBLICATIONS

"Compositing Digital Images"; Porter, Thomas; Duff, Tom; *Computer Graphics*; vol. 18, No. 3; Jul. 1984; pp. 253–259.
"Now PC Users Say it With 'Voice Notes'"; William M. Bulkeley *Wall Street Journal*; pp. B1, B5. Date Unknown.

(List continued on next page.)

*Primary Examiner*—Joseph Ruggiero
*Attorney, Agent, or Firm*—Calfee, Halter & Griswold

[57] ABSTRACT

A machine and method are provided for selecting product or service design, such as a social expression product. The machine and method each (i) stores a plurality of product or service designs and a plurality of descriptors for each of the plurality of product or service designs, each of the descriptors representing an application scale; (ii) stores an expert-predetermined optimum applicability value for each combination of the application scales and the product or service designs; (iii) presents, to a customer, selection criteria options for one or more application scales; (iv) stores customer preference values for one or more application scales used for describing the product/service design, the customer preference values to be predetermined by expert judgment and assigned to application scales where such values correspond to the selection criteria options chosen by the customer; (v) quantitatively correlates, by means of a correlation algorithm, each of the customer preference values with corresponding expert-predetermined optimum applicability values to calculate an average suitability rating for each of the product or service designs based on the customer-chosen selection criteria options; and (vi) displays for the customer a group of identified product or service designs based on the average suitability ratings for those identified product or service designs. In the case of a product, the apparatus and method solicit the customer to select one of the identified product designs, verify the selection and possibly modify the selected product design. The selected or modified product design may then be dispensed to the customer.

72 Claims, 28 Drawing Sheets

U.S. PATENT DOCUMENTS

| | | | |
|---|---|---|---|
| 3,609,250 | 9/1971 | Morris | 179/100 |
| 3,637,934 | 1/1972 | Brewster | 178/6.6 A |
| 3,669,814 | 6/1972 | Faltin | 161/37 |
| 3,688,276 | 8/1972 | Quinn | 340/172.5 |
| 3,704,362 | 11/1972 | Kolby et al. | 235/151.13 |
| 3,705,384 | 12/1972 | Wahlberg | 340/149 |
| 3,727,038 | 4/1973 | Ritter et al. | 235/151.1 |
| 3,757,037 | 9/1973 | Bialek | 348/107 |
| 3,800,932 | 4/1974 | Dana | 194/10 |
| 3,819,854 | 6/1974 | Kolb | 178/6.7 R |
| 3,828,904 | 8/1974 | Naitou et al. | 194/10 |
| 3,829,833 | 8/1974 | Freeny, Jr. | 340/149 |
| 3,864,708 | 2/1975 | Allen | 354/290 |
| 3,898,930 | 8/1975 | Ikegami et al. | 101/316 |
| 3,911,397 | 10/1975 | Freeny, Jr. | 340/147 |
| 3,924,065 | 12/1975 | Freeny, Jr. | 178/66 |
| 3,932,036 | 1/1976 | Ueda et al. | 355/40 |
| 3,938,190 | 2/1976 | Semmlow et al. | 360/72 |
| 3,943,335 | 3/1976 | Kinker et al. | 235/61.7 B |
| 3,946,220 | 3/1976 | Brobeck et al. | 235/168 |
| 3,949,375 | 4/1976 | Ciarlo | 340/172.5 |
| 3,970,992 | 7/1976 | Broothroyd et al. | 340/172.5 |
| 3,990,710 | 11/1976 | Hughes | 274/1 R |
| 4,007,362 | 2/1977 | Sindermann | 235/151 |
| 4,023,013 | 5/1977 | Kinker | 235/61.7 B |
| 4,034,839 | 7/1977 | Lee | 194/10 |
| 4,041,467 | 9/1977 | Cota et al. | 364/900 |
| 4,058,056 | 11/1977 | Rubin | 101/93.19 |
| 4,069,896 | 1/1978 | Rottmann et al. | 186/1 B |
| 4,070,223 | 1/1978 | Stalzer | 156/264 |
| 4,070,698 | 1/1978 | Curtis et al. | 360/12 |
| 4,071,911 | 1/1978 | Mazur | 364/900 |
| 4,073,368 | 2/1978 | Mustapick | 186/1 C |
| 4,085,445 | 4/1978 | Blevins et al. | 364/900 |
| 4,096,933 | 6/1978 | Massa | 194/100 |
| 4,112,421 | 9/1978 | Freeny, Jr. | 343/112 |
| 4,144,656 | 3/1979 | Podkopaev et al. | 35/9 |
| 4,160,271 | 7/1979 | Grayson et al. | 364/400 |
| 4,173,024 | 10/1979 | Miller | 358/115 |
| 4,190,819 | 2/1980 | Burgyan | 340/23 |
| 4,193,114 | 3/1980 | Benini | 364/200 |
| 4,209,588 | 6/1980 | Freeny, Jr. | 343/112 |
| 4,209,787 | 6/1980 | Freeny, Jr. | 343/112 |
| 4,216,286 | 8/1980 | Greene et al. | 430/203 |
| 4,220,991 | 9/1980 | Hamano et al. | 364/405 |
| 4,224,601 | 9/1980 | Davidson | 346/150 |
| 4,232,317 | 11/1980 | Freeny, Jr. | 343/112 |
| 4,232,334 | 11/1980 | Dyson | 358/93 |
| 4,239,380 | 12/1980 | Goldsholl | 355/52 |
| 4,247,759 | 1/1981 | Yuris et al. | 235/381 |
| 4,260,229 | 4/1981 | Bloomstein | 352/50 |
| 4,261,012 | 4/1981 | Maloomian | 358/93 |
| 4,265,371 | 5/1981 | Desai et al. | 222/70 |
| 4,270,182 | 5/1981 | Asija | 364/900 |
| 4,275,449 | 6/1981 | Aish | 364/512 |
| 4,300,040 | 11/1981 | Gould et al. | 235/381 |
| 4,305,131 | 12/1981 | Best | 364/521 |
| 4,308,017 | 12/1981 | Laughon et al. | 434/169 |
| 4,318,121 | 3/1982 | Taite et al. | 358/22 |
| 4,319,336 | 3/1982 | Anderson et al. | 364/900 |
| 4,328,544 | 5/1982 | Baldwin et al. | 364/405 |
| 4,329,710 | 5/1982 | Taylor | 358/81 |
| 4,339,134 | 7/1982 | Macheel | 273/138 |
| 4,354,613 | 10/1982 | Desai et al. | 221/4 |
| 4,358,824 | 11/1982 | Glickman et al. | 364/200 |
| 4,359,631 | 11/1982 | Lockwood et al. | 235/381 |
| 4,359,634 | 11/1982 | Saito et al. | 250/201 |
| 4,396,307 | 8/1983 | Shah et al. | 400/625 |
| 4,412,292 | 10/1983 | Sedam et al. | 364/479 |
| 4,414,467 | 11/1983 | Gould et al. | 235/381 |
| 4,414,896 | 11/1983 | Fischer | 101/211 |
| 4,417,322 | 11/1983 | Berry et al. | 364/900 |
| 4,417,722 | 11/1983 | Ishii et al. | 266/250 |
| 4,429,385 | 1/1984 | Cichelli et al. | 370/92 |
| 4,431,323 | 2/1984 | Kulow | 400/625 |
| 4,434,467 | 2/1984 | Scott | 364/400 |
| 4,435,772 | 3/1984 | Suzuki et al. | 364/520 |
| 4,438,326 | 3/1984 | Uchida | 235/379 |
| 4,441,160 | 4/1984 | Azcua et al. | 364/900 |
| 4,449,186 | 5/1984 | Kelly et al. | 364/407 |
| 4,458,802 | 7/1984 | Maciver et al. | 194/4 R |
| 4,459,676 | 7/1984 | Oguchi | 364/521 |
| 4,460,957 | 7/1984 | Eggebrecht et al. | 364/200 |
| 4,463,874 | 8/1984 | Friedman et al. | 221/238 |
| 4,467,349 | 8/1984 | Maloomian | 358/93 |
| 4,481,590 | 11/1984 | Otten | 364/479 |
| 4,484,304 | 11/1984 | Anderson et al. | 364/900 |
| 4,486,774 | 12/1984 | Maloomian | 358/93 |
| 4,488,244 | 12/1984 | Freeman | 364/525 |
| 4,489,389 | 12/1984 | Beckwith et al. | 364/522 |
| 4,495,582 | 1/1985 | Dessert et al. | 364/469 |
| 4,498,139 | 2/1985 | Malinovsky | 364/518 |
| 4,517,578 | 5/1985 | Tazaki | 346/140 |
| 4,519,037 | 5/1985 | Brodeur et al. | 364/400 |
| 4,519,522 | 5/1985 | McElwee | 221/13 |
| 4,520,451 | 5/1985 | McLaughlin | 364/900 |
| 4,528,643 | 7/1985 | Freeny, Jr. | 364/900 |
| 4,546,434 | 10/1985 | Gioello | 364/300 |
| 4,553,222 | 11/1985 | Kurland et al. | 364/900 |
| 4,559,598 | 12/1985 | Goldwasser et al. | 364/419 |
| 4,567,359 | 1/1986 | Lockwood | 235/381 |
| 4,575,813 | 3/1986 | Bartlett et al. | 364/900 |
| 4,577,206 | 3/1986 | Hibino | 346/139 |
| 4,591,281 | 5/1986 | Howard et al. | 400/126 |
| 4,591,983 | 5/1986 | Bennett et al. | 364/403 |
| 4,596,924 | 6/1986 | Watanabe | 235/379 |
| 4,598,376 | 7/1986 | Burton et al. | 364/470 |
| 4,598,810 | 7/1986 | Shore et al. | 194/205 |
| 4,599,598 | 7/1986 | Komoda et al. | 340/310 |
| 4,602,299 | 7/1986 | Saito | 360/60 |
| 4,608,662 | 8/1986 | Watanabe et al. | 364/900 |
| 4,610,200 | 9/1986 | Metso | 101/126 |
| 4,616,327 | 10/1986 | Rosewarne et al. | 364/518 |
| 4,623,292 | 11/1986 | Suzuki et al. | 414/114 |
| 4,623,964 | 11/1986 | Getz et al. | 364/401 |
| 4,625,275 | 11/1986 | Smith | 364/401 |
| 4,627,015 | 12/1986 | Stephens | 364/900 |
| 4,644,401 | 2/1987 | Gaskins | 358/183 |
| 4,646,250 | 2/1987 | Childress | 364/518 |
| 4,649,513 | 3/1987 | Martin et al. | 364/900 |
| 4,650,977 | 3/1987 | Couch | 235/379 |
| 4,652,998 | 3/1987 | Koza et al. | 364/412 |
| 4,654,799 | 3/1987 | Ogaki et al. | 364/479 |
| 4,655,026 | 4/1987 | Wigoda | 53/55 |
| 4,664,546 | 5/1987 | Rünzi | 400/624 |
| 4,668,150 | 5/1987 | Blumberg | 414/273 |
| 4,672,554 | 6/1987 | Ogaki | 364/479 |
| 4,674,041 | 6/1987 | Lemon et al. | 364/401 |
| 4,674,055 | 6/1987 | Ogaki et al. | 364/479 |
| 4,677,565 | 6/1987 | Ogaki et al. | 364/479 |
| 4,677,570 | 6/1987 | Taki | 364/518 |
| 4,683,536 | 7/1987 | Yamamoto | 364/408 |
| 4,699,532 | 10/1987 | Smith | 400/104 |
| 4,700,181 | 10/1987 | Maine et al. | 340/747 |
| 4,700,317 | 10/1987 | Watanabe et al. | 364/488 |
| 4,700,318 | 10/1987 | Ockman | 364/518 |
| 4,703,465 | 10/1987 | Parker | 369/30 |
| 4,710,885 | 12/1987 | Litteken | 364/518 |
| 4,712,174 | 12/1987 | Minkler, II | 364/200 |
| 4,714,936 | 12/1987 | Helinski et al. | 346/140 |
| 4,719,885 | 1/1988 | Nagano et al. | 123/179 |
| 4,722,053 | 1/1988 | Dubno et al. | 364/401 |

| | | | |
|---|---|---|---|
| 4,723,212 | 2/1988 | Mindrum et al. | 364/401 |
| 4,726,697 | 2/1988 | Maedge et al. | 400/625 |
| 4,727,589 | 2/1988 | Hirose et al. | 382/56 |
| 4,733,362 | 3/1988 | Haraguchi | 364/479 |
| 4,736,306 | 4/1988 | Christensen et al. | 364/513 |
| 4,740,904 | 4/1988 | Nagle | 364/520 |
| 4,745,560 | 5/1988 | Decker et al. | 364/519 |
| 4,750,122 | 6/1988 | Kaji et al. | 364/419 |
| 4,750,131 | 6/1988 | Martinez | 364/476 |
| 4,750,151 | 6/1988 | Baus | 364/900 |
| 4,764,867 | 8/1988 | Hess | 364/200 |
| 4,764,880 | 8/1988 | Pearl | 364/519 |
| 4,766,548 | 8/1988 | Cedrone et al. | 364/479 |
| 4,766,581 | 8/1988 | Korn et al. | 369/30 |
| 4,771,401 | 9/1988 | Kaufman et al. | 364/900 |
| 4,772,882 | 9/1988 | Mical | 340/709 |
| 4,773,009 | 9/1988 | Kucera et al. | 364/419 |
| 4,775,935 | 10/1988 | Yourick | 364/401 |
| 4,779,080 | 10/1988 | Coughlin et al. | 340/712 |
| 4,786,229 | 11/1988 | Henderson | 414/786 |
| 4,787,050 | 11/1988 | Suzuki | 364/479 |
| 4,789,147 | 12/1988 | Berger et al. | 270/1.1 |
| 4,789,907 | 12/1988 | Fischetti et al. | 360/33.1 |
| 4,794,403 | 12/1988 | Sleber et al. | 346/33 |
| 4,801,375 | 1/1989 | Padilla | 210/100 |
| 4,802,170 | 1/1989 | Trottier | 371/40 |
| 4,811,240 | 3/1989 | Ballou et al. | 364/518 |
| 4,811,247 | 3/1989 | Malady et al. | 364/550 |
| 4,814,592 | 3/1989 | Bradt et al. | 235/381 |
| 4,817,005 | 3/1989 | Kubota et al. | 364/468 |
| 4,817,042 | 3/1989 | Pintsov | 364/478 |
| 4,817,043 | 3/1989 | Brown | 364/518 |
| 4,818,854 | 4/1989 | Davies et al. | 235/381 |
| 4,821,197 | 4/1989 | Kenik et al. | 364/468 |
| 4,822,365 | 4/1989 | Walker et al. | 623/20 |
| 4,833,307 | 5/1989 | Gonzalez-Justiz | 235/375 |
| 4,835,683 | 5/1989 | Phillips et al. | 364/200 |
| 4,839,505 | 6/1989 | Bradt et al. | 235/381 |
| 4,839,829 | 6/1989 | Freedman | 364/519 |
| 4,845,635 | 7/1989 | Rosselli | 364/474.01 |
| 4,845,653 | 7/1989 | Conrad et al. | 364/521 |
| 4,847,473 | 7/1989 | Lee et al. | 235/381 |
| 4,847,761 | 7/1989 | Ferriter et al. | 364/401 |
| 4,852,013 | 7/1989 | Durst, Jr. et al. | 364/478 |
| 4,856,653 | 8/1989 | Ackeret | 206/387 |
| 4,862,376 | 8/1989 | Ferriter et al. | 364/468 |
| 4,864,502 | 9/1989 | Kucera et al. | 364/419 |
| 4,866,661 | 9/1989 | de Prins | 364/900 |
| 4,870,576 | 9/1989 | Tornetta | 364/401 |
| 4,873,643 | 10/1989 | Powell et al. | 364/468 |
| 4,882,675 | 11/1989 | Nichtberger et al. | 364/401 |
| 4,884,199 | 11/1989 | Boothroyd et al. | 364/408 |
| 4,887,217 | 12/1989 | Sherman et al. | 364/468 |
| 4,891,660 | 1/1990 | Biondo, Jr. | 354/412 |
| 4,896,791 | 1/1990 | Smith | 221/7 |
| 4,903,815 | 2/1990 | Hirschfeld et al. | 194/205 |
| 4,916,637 | 4/1990 | Allen et al. | 364/513 |
| 4,918,604 | 4/1990 | Baum | 364/413.01 |
| 4,924,385 | 5/1990 | Dote | 364/300 |
| 4,937,439 | 6/1990 | Wanninger et al. | 235/456 |
| 4,949,257 | 8/1990 | Orbach | 364/401 |
| 4,951,203 | 8/1990 | Halamka | 364/419 |
| 4,954,956 | 9/1990 | Yamakawa et al. | 364/419 |
| 4,954,981 | 9/1990 | Dehner, Jr. et al. | 364/900 |
| 4,961,507 | 10/1990 | Higgins | 221/129 |
| 4,964,043 | 10/1990 | Galvin | 364/401 |
| 4,970,655 | 11/1990 | Winn et al. | 364/479 |
| 4,972,318 | 11/1990 | Brown et al. | 364/403 |
| 4,974,170 | 11/1990 | Bouve et al. | 364/518 |
| 4,982,337 | 1/1991 | Burr et al. | 364/479 |
| 4,982,343 | 1/1991 | Hourvitz et al. | 364/521 |
| 4,982,346 | 1/1991 | Girouard et al. | 364/550 |
| 4,991,108 | 2/1991 | Hamilton | 364/514 |
| 4,992,940 | 2/1991 | Dworkin | 364/401 |
| 4,993,587 | 2/1991 | Abe | 221/21 |
| 4,999,065 | 3/1991 | Wilfert | 156/64 |
| 5,007,084 | 4/1991 | Materna et al. | 380/24 |
| 5,008,810 | 4/1991 | Kessel et al. | 364/200 |
| 5,016,183 | 5/1991 | Shyong | 364/470 |
| 5,017,953 | 5/1991 | Biondo, Jr. | 354/83 |
| 5,018,085 | 5/1991 | Smith, Jr. | 364/526 |
| 5,020,958 | 6/1991 | Tuttobene | 414/281 |
| 5,021,953 | 6/1991 | Webber et al. | 364/407 |
| 5,025,397 | 6/1991 | Suzuki | 364/519 |
| 5,025,399 | 6/1991 | Wendt et al. | 364/519 |
| 5,029,099 | 7/1991 | Goodman | 364/479 |
| 5,032,989 | 7/1991 | Tornetta | 364/401 |
| 5,036,472 | 7/1991 | Buckley et al. | 364/479 |
| 5,038,293 | 8/1991 | Goodman | 364/479 |
| 5,040,132 | 8/1991 | Schuricht et al. | 364/523 |
| 5,047,613 | 9/1991 | Swegen et al. | 235/379 |
| 5,047,959 | 9/1991 | Phillips et al. | 364/521 |
| 5,053,956 | 10/1991 | Donald et al. | 364/401 |
| 5,056,029 | 10/1991 | Cannon | 364/468 |
| 5,061,098 | 10/1991 | Engelhardt et al. | 400/625 |
| 5,062,147 | 10/1991 | Pickett et al. | 364/900 |
| 5,084,817 | 1/1992 | Kumano et al. | 364/419 |
| 5,088,052 | 2/1992 | Spielman et al. | 395/158 |
| 5,088,586 | 2/1992 | Isobe et al. | 194/205 |
| 5,099,422 | 3/1992 | Foresman et al. | 364/401 |
| 5,109,337 | 4/1992 | Ferriter et al. | 364/401 |
| 5,111,392 | 5/1992 | Malin | 364/401 |
| 5,115,504 | 5/1992 | Belove et al. | 395/600 |
| 5,119,475 | 6/1992 | Smith et al. | 395/156 |
| 5,132,915 | 7/1992 | Goodman | 364/479 |
| 5,146,403 | 9/1992 | Goodman | 364/401 |
| 5,148,370 | 9/1992 | Litt et al. | 364/468 |
| 5,153,825 | 10/1992 | Yauk et al. | 364/401 |
| 5,163,006 | 11/1992 | Deziel | 364/470 |
| 5,172,245 | 12/1992 | Kita et al. | 358/403 |
| 5,187,797 | 2/1993 | Nielsen et al. | 395/800 |
| 5,195,030 | 3/1993 | White | 364/401 |
| 5,200,888 | 4/1993 | Hashimoto | 364/400 |
| 5,206,804 | 4/1993 | Thies et al. | 364/401 |
| 5,208,745 | 5/1993 | Quentin et al. | 364/188 |
| 5,235,519 | 8/1993 | Miura | 364/478 X |
| 5,241,671 | 8/1993 | Reed et al. | 395/600 |
| 5,243,174 | 9/1993 | Veeneman et al. | 235/381 |
| 5,442,567 | 8/1995 | Small | 364/478 X |
| 5,452,221 | 9/1995 | Tumidei | 364/479 X |

FOREIGN PATENT DOCUMENTS

| | | |
|---|---|---|
| 89819937 | 1/1989 | European Pat. Off. . |
| 90313917 | 12/1990 | European Pat. Off. . |
| 91309669 | 10/1991 | European Pat. Off. . |
| 87 13494 | 9/1987 | France . |
| 89 09224 | 6/1989 | France . |
| 3919726 | 6/1989 | Germany . |
| 59-33573 | 2/1984 | Japan . |
| 59-144078 | 2/1984 | Japan . |
| 59-194263 | 5/1984 | Japan . |
| 1005827 | 5/1963 | United Kingdom . |
| 1388942 | 4/1972 | United Kingdom . |
| 2050106A | 4/1980 | United Kingdom . |
| 2065412A | 10/1980 | United Kingdom . |
| 2092354 | 9/1981 | United Kingdom . |
| 2105075 | 5/1982 | United Kingdom . |
| 2119600A | 4/1983 | United Kingdom . |
| 2150728 | 11/1984 | United Kingdom . |
| 2177245B | 5/1986 | United Kingdom . |
| 2177245A | 5/1986 | United Kingdom . |
| 2222341A | 6/1988 | United Kingdom . |
| 2208460A | 7/1988 | United Kingdom . |
| 2240897A | 8/1990 | United Kingdom . |

| | | |
|---|---|---|
| 2228125A | 8/1990 | United Kingdom . |
| 2246929A | 12/1992 | United Kingdom . |
| PCT/NO81/00028 | 7/1981 | WIPO . |
| PCT/AU82/00123 | 4/1982 | WIPO . |
| PCT/US82/0115.3 | 8/1982 | WIPO . |
| PCT/US83/00628 | 5/1983 | WIPO . |
| PCT/US90/06283 | 10/1989 | WIPO . |
| PCT/US89/05364 | 11/1989 | WIPO . |
| PCT/EP90/02079 | 6/1991 | WIPO . |
| PCT/FR91/00650 | 8/1991 | WIPO . |
| PCT/US92/02603 | 10/1992 | WIPO . |

OTHER PUBLICATIONS

"Touch–Screens For Intuitive Input", M. David Stone, *PC Magazine*, Aug. 1987, pp. 183–192.
"Touch Screens: A Viable Mouse Alternative", *PC Week*, p. 90; Date Unknown.
"Man to Machine via Screen",*PC Week*, p. 41; Date Unknown.
"Autoclerk" *ABA Journal*, Apr. 1992.
"Gay groups put their cards on the table, so Hallmark lifts ban on using 'lesbian'"; Hodges, Michael, *Detroit News*, Oct. 28, 1991, p. 1C.
"Toys, gift for upcoming holiday shopping lists", Magid, Judy, *Salt Lake Tribune*, Oct. 14, 1991.
"If you care enough to keyboard the best", Bombeck, Erma, *Star–Ledger*, Oct. 17, 1991.
"Software Tools for Writers", Holder, Wayne, *Byte Publication Inc.*, Jul. 1992, pp. 128–163.
"Pioneering Perspective", Yeazel, Lynn A. *Optical Information Systems*, Feb. 1986, pp. 36, 37.
"Retailers Beginning to Tune in Video Displays", *Advertising Age*, Nov. 1985, p. 66.
"Computers, Fiction, and Poetry", McKean, Kevin *Byte Publications*, Jul. 1992, pp. 50–53.
"Creative Writing with Computers", Owens, Peter, *Popular Computing*, Jan. 1984, pp. 128–132.
"Interactive Fiction: Six Micro Stories", Liddil, Bob, *BYTE Publications, Inc.* Sep. 1981, p. 436.
"GOSUB: Poet: Return Computers and the Poetic Muse", Marcus, Stephen, *Educational Technology*, Aug., 1984 pp. 15–20.
"Comp–U–Store System Could Change Retail Economics", *Direct Marketing*, Jul. 1983, pp. 101–107.
"Setting Up Shop on Computer Screens", Gatty, Bob, *Nation's Business*, Mar. 1984, pp. 57–58.
"EDR puts Auto Insurance Policy 'On Line'", Mooney, Barbara, *Crain's Cleveland Business*, Mar. 30, 1992, p. 23.
"TouchSelect Turns Ordinary Monitors Into Touch–Screens", Zelnick, Nate, *PC Magazine*, Dec. 17, 1991, p. 42.
"Maintenance by Modem: Processing Problems Can Be Solved Remotely"; Kreisher, Keith; *Modern Plastics*; Jan. 1990; p. 44.
"The Touchables"; *Informationweek*; Apr. 13, 1992; p. 44.
"Card Compete in New Outlets"; Toth, Debora; *Graphic Arts Monthly*; Dec. 1991; pp. 48–50.
"How Computerized Cards Make This Shop 'Truly a Treat"; Hohman, Edward J.; *Greetings Magazine*; Jan. 1987; pp. 12–13 and 24.
"Ryhme is Money with The Magical Poet"; *The Computer Poet Corp. Brochure*; Date Unknown.
"This Computer Can Ryhme . . . for Three Bucks Each Time"; *Changing Times*; Jan. 1986.
"Cardmarketing . . . Your Way to a Powerful Database"; Corliss, Paul W., Jr.; *Dynamic Controls, Inc.*; Date Unknown.
"These Instant–Win Games Talk Back"; *ADWeek's Promote; p. 4; Date Unknown.*
"CASPIR, Computer Aided Searching and Patent Image Retrieval", pp. 1, 8, 9, 10, 12, 13.; Date Unknown.
"Point–of–Sale Terminal System with Clerical Facilities/Functions", G. Allmendinger, A. Bette, K. H. Engler, B. Haeusser and R. Muehlenbrock, *IBM Technical Disclosure Bulletin*, Jan. 1976, pp. 2554, 2555.
"Knowledge–Assisted Document Retrieval: I. The Natural–Language Interface"; Biswas, Bezdek, Marques, Subramanian; *Journal of The American Society For Information Science*; pp. 83–96; Mar. 1987.
"Knowledge–Assisted Document Retrieval: II. The Retrieval Process"; Biswas, Bezdek, Subramanian, Marques, *Journal of the American Society For Information Science*; pp. 97–110; Mar. 1987.
"$T^3$R: A New Approach to the Design of Document Retrieval Systems"; W. B. Croft and R. H. Thompson; *Journal of the American Society For Information Science*; pp. 389–404; Nov. 1987.
"Integrating Mechanisms for Storage and Retrieval of Land Data"; Andrew Frank; *Surveying and Mapping*, vol. 46, No. 2, pp. 107–121.; June 1986.
"Retrieval of Help Information for Novice Users of Interactive Computer Systems"; Andrew M. Cohill; *Human Factors*; Jun. 1985; pp. 335–343.
"Automatic Tex Generation"; R. Marsh; *Br Telecom Technol J* vol. 6 No. 4; Oct. 1988; pp. 84–88.
"Advanced Feedback Methods in Information Retrieval"; G. Salton, E. A. Fox, E. Voorhees; *Journal of the American Society for Information Science*; May 1985, pp. 200–210.
"Producing Geological Illustrations Using PC–Based Computer–Aided Drafting"; K. Cameron, D. Cameron, P. Kelleher; *Computers & Geosciences*, vol. 14, No. 3 pp. 291–297; 1988.
"Adapting of String Indexing Systems For Retrieval Using Proximity Operators"; Timothy C. Craven, *Information Processing & Management*; vol. 24, No. 2, pp. 133–140, 1988.
"A language for simple interactive retrieval from a database system"; Perry Jones and Michael Shave; *Data & Knowledge Engineering 2*, 1987, pp. 303–321.
"Automated Storage and Retrieval of Work Standards"; Richard A. Bihr; *Computers ind. Engng*, vol. 13, No. 1–14, pp. 312–316, 1987.
"A Novice User's Interface to Information Retrieval Systems"; R. G. Crawford and H. S. Becker; *Information Processing & Management*, vol. 22, No. 4, pp. 287–298, 1986.
"Novel Filing Systems Applicable To An Automted Office: A State–Of–The–Art Study"; F. Mark Restorick; *Information Processing & Management*; vol. 22, No. 2, pp. 151–172, 1986."Thesaurus For End–User Indexing and Retrieval; Gary W. Strong, M. Carl Drott; *Information Processing & Management;* Vol. 22, No. 6, "OAKDEC, A Program For Studying The Effects on Users of a Procedural Expert System for Database Searching"; Charles T. Meadow, *Information Processing & Management,* vol. 24, No. 4, pp. 449–457, 1988.

"WYSIWIS Revised: Early Experiences with Multiuser Interfaces"; M. Stefik, D. G. Bobrow, G. Foster, S. Lanning, and D. Tatar; *ACM Transactions on Office Information Systems,* vol. 5, No. 2, Apr. 1987 pp. 147–167.

"Criteria For the Evaluation of Text Storage and Retrieval Software"; Paul Nieuwenhuysen, *The Electronic Library,* Jun. 1988, vol. 6, No. 3; pp. 160–166.

"A Visual User Interface for Map Information Retrieval Based on Semantic Significance"; M. Tanaka and T. Ichikawa; *IEEE Transactions On Software Engineering,* vol. 14, No. 5, pp. 666–670, May 1988.

"Interactive Document Display and Its Use In Information Retrieval; J. D. Bovey and P. J. Brown; *Journal of Documentation,* vol. 43, No. 2, Jun. 1987, pp. 125–137.

"Image Retrieval Systems Based on Object Features"; Akio Yamamoto and Mikio Takagi, *IEEE Montech* 1987, pp. 131–134.

"Retrieval Techniques"; Nicholas J. Belkin, W. Bruce Croft; *Annual Review of Information Science and Technology,* vol. 22, 1987, pp. 108–145.

"Video–Graphic Query Facility For Database Retrieval"; Nancy H. McDonald, *Visual Computer,* 1966; pp. 72–77.

"Targeted Marketing", Paul corliss, *Foodmarketing;* vol. 1. No. 1, Jan./Feb. 1989.

"Melpas–1 Ticket–Issuing Apparatus" by Ken 'Ichi Murato, Tadahiro Okura, Eliji Suzuki & Masataka Kobayashi; *Mitsubishi Denki Giho,* vol. 55, No. 4 pp. 35–39 (1981).

"Point–Of–Sale Terminal System With Clerical Facilities/Functions"; by G. Alimendinger, A. Bette, J. H. Engler, B. Haeusser and R. Muehlenbrock; *IBM Technical Disclosure Bulletin;* vol. 18, No. 8, Jan. 1976; pp. 2554–2555.

"Filing and Retrieval of Unstructured Information: Some Systems Considerations; J. Bansler, et al.; *Espirit '84* Brochure; pp. 295–313.

"The Interactive Display Design Tool: An Application Program for Human Factors Part Task Simulation Development; Mark W. Smith, et al. 1899 *IEEE;* pp. 856–859.

"A Frame–based Interface for Question–Answering Systems"; Toshihisa Takagi, et al. 1985 *IEEE;* pp. 388–393.

"The Use of Adaptive Mechanisms For Selection of Search Strategies in Document Retrieval Systems"; W. Bruce Croft, et al.; Department of Computer and Information Science, University of Massachusetts, pp. 95–110; date unknown.

"An Interactive Database End User Facility For the Definition and Manipulation of Forms"; A. H. F. Laender, et al.; School of Computing Studies and accountancy, University of East Anglia, Norwich, NR 4 71J, England; pp. 40–54; date unknown.

"CAD Generation of Accident Diagrams For Local Agencies"; Willard Lyman, et al.; *Microcomputer Within Transportation* Brochure; pp. 657–664; date unknown.

"Which Way to Go With Interactive Video"; 1987 Interac Corporation Brochure.

"Interactive Video Merchandising"; By Video Inc. Brochure, May 1988.

"Vision 1000 The Total Promotion Delivery Vehicle"; Advanced Promotion Technologies–Brochure; date unknown.

"Food Chain Employees Scanning Technology In Instant Win/Prize Drawing Promotion"; Incentives in Action Brochure; date unknown.

"Direct Marketing Goes Electronic", Larry Riggs, *Sales & Marketing Management,* vol. 134, No. 1, Jan. 14, 1985, pp. 59–60.

Videodisc: Product Search System Launched for Architects and Interior Designers, *Videodisc and Optical Disk,* vol. 5, no. 4, Jul. 1985, pp. 244–247.

Current Spring 1987 Sale Catalog.

Current Christmas 1987 Catalog.

Current Birthday 1987 Catalog.

Current Valentine 1987 Catalog.

Photo enlargements via vending machine; Kodak Create–A––Print 35mm enlargment center; *Machine Design,* vol. 60; No. 9; p. 12; 1988.

54,56,58

| DESIGN DATA FILES | | | | |
|---|---|---|---|---|
| DESIGN aa | DESIGN ab | • • • • • • • • • • • • • • • • | DESIGN zy | DESIGN zz |

FIG. 4

70

| SELECTION CRITERIA / PRODUCT DESIGN | CORRELATION DATA FILE | | | | | | | | | |
|---|---|---|---|---|---|---|---|---|---|---|
| | DIMENSION 1 | | | DIMENSION 2 | | | ••• | DIMENSION p | | |
| | DMV 1-1 | [DMV 1-2] | [DMV 1-m] | [DMV 2-1] | DMV 2-2 | DMV 2-m | | DMV p-1 | [DMV p-2] | DMV p-m |
| aa | OAV 1-aa | | | OAV 2-aa1/OAV 2-aa2 | | | | OAV p-aa | | |
| ab | OAV 1-ab | | | OAV 2-ab | | | | OAV p-ab | | |
| ••• | | | | | | | | | | |
| zy | OAV 1-zy | | | OAV 2-zy | | | | OAV p-zy | | |
| zz | OAV 1-zz | | | OAV 2-zz | | | | OAV p-zz | | |

FIG. 7

64

| SELECTION CRITERIA DATA FILE | | | | | | | | | |
|---|---|---|---|---|---|---|---|---|---|
| DIMENSION 1 | | | DIMENSION 2 | | | ••• | DIMENSION p | | |
| SCALE | | | SCALE | | | | SCALE | | |
| MARKER 1-1 | MARKER 1-2 | MARKER 1-m | MARKER 2-1 | MARKER 2-2 | MARKER 2-m | | MARKER p-1 | MARKER p-2 | MARKER p-m |
| DMV 1-1 | DMV 1-2 | DMV 1-m | DMV 2-1 | DMV 2-2 | DMV 2-m | | DMV p-1 | DMV p-2 | DMV p-m |

$DMV_{ij}$ = EXPERT PREDETERMINED DESCRIPTIVE MARKER VALUE FOR DIMENSION i, DESCRIPTIVE MARKER j

FIG. 5A 66, 68

| PRODUCT DESIGN | DESIGN APPLICABILITY DATA FILE | | | |
|---|---|---|---|---|
| | DIMENSION 1 | DIMENSION 2 | ••• | DIMENSION p |
| aa | OAV 1-aa | OAV 2-aa1/OAV 2-aa2 | | OAV p-aa |
| ab | OAV 1-ab | OAV 2-ab | | OAV p-ab |
| ••• | • • • • • | • • • • • | ••• | • • • • • |
| zy | OAV 1-zy | OAV 2-zy | | OAV p-zy |
| zz | OAV 1-zz | OAV 2-zz | | OAV p-zz |

$OAV_{i-xy}$ = EXPERT PREDETERMINED OPTIMUM APPLICABILITY VALUE FOR DIMENSION i, PRODUCT DESIGN xy

FIG. 6A

FIG. 5B1

DESIGN MEASUREMENT SCALES AND APPLICABILITY MARKERS

| OCCASIONS | VALUES: 0 | 25 | 50 | 75 | 100 |
|---|---|---|---|---|---|
| BIRTHDAY OCCASIONS | | | | | |
| A. REGULAR BIRTHDAY | (NEVER) | (POSSIBLY) | (PROBABLY) | (MOSTLY) | (ALWAYS) |
| B. BELATED BIRTHDAY | " | " | " | " | " |
| NON-OCCASIONS | | | | | |
| C. FRIENDLY GREETING | " | " | " | " | " |
| D. LOVE NOTE | " | " | " | " | " |
| SEASON OCCASIONS | | | | | |
| E. VALENTINE'S | " | " | " | " | " |
| F. EASTER | " | " | " | " | " |

SENDER-RECEIVER RELATIONSHIPS

G. NON-FAMILY ANYONE BUSINESS ACQUAINTANCE CO-WORKER GOOD FRIEND ROOMMATE COMPANION LOVER FIANCEE
H. FAMILY DISTANT IN-LAW NEAR CLOSE GRANDPARENT SIBLING LIKE PARENT PARENT CHILD SPOUSE
I. SPECIAL UNUSUAL MILITARY FRAT/SORORITY SECRETARY EMPLOYEE TEACHER BOSS

SENDER/RECIPIENT TRAITS

J. RECIPIENT AGE 4-7 8-11 12-15 16 17-20 21-30 31-45 46-65 65 +
K. RECIPIENT GENDER FEMALE MOSTLY FEMALES COUPLE/MIXED MOSTLY MALES MALE
L. RECIPIENT NO. ONE TWO COUPLE SMALL GROUP LARGE GROUP

MATCH TO FIG. 5B2

MATCH TO FIG. 5B1

M. SENDER AGE: 4-7 | 8-11 | 12-15 | 16 | 17-19 | 20-30 | 30-40 | 50-65 | 65 +

N. SENDER GENDER: FEMALE | MOSTLY FEMALES | COUPLE/MIXED | MOSTLY MALES | MALE

O. SENDER NO.: ONE | TWO | COUPLE | SMALL GROUP | LARGE GROUP

DESIGN THEMES AND STYLES

P. SENTIMENT THEME: GET LOST | LET'S BREAK OFF | NOT HAPPY | COOL GRTG | CASUAL GRTG | HI, HELLO | FRIENDLY NOTE | WARM NOTE | THINKING OF YOU | MISSING YOU | LOVE NOTE | FLIRTY NOTE | LUSTY NOTE

Q. COMPLIMENT TYPE: PLAYFUL INSULT | FUN PUT-DOWN | NICE THOUGHTS | COMPLIMENTARY THOUGHTS | DIRECT COMPLIMENT | STRONG COMPLIMENT | FLATTERING NOTE

R. FEELINGS: DEEP REGRET | CHAGRIN | SORRY, APOLOGY | NO FEELING, NEUTRAL | GLAD | PLEASED, PROUD | EXTREMELY HAPPY | EXULTANT, EUPHORIC

S. HUMOR CONTENT: SAD | SOBER, FORMAL | SERIOUS | CHEERFUL THOUGHTS | LIGHT TOUCH | MILD HUMOR | WORD FUN | FUNNY | VERY FUNNY | OUTRAGEOUS, OFF-THE-WALL

T. ENDEARMENT STYLE: BITING | SARCASTIC | SMART ALECK | PLAY-FUL | IMPERSONAL PROSE/POETRY | PERSONAL PROSE/POETRY | ENDEARING INTIMACY | SWEET SENTIMENTALITY

U. SUBJECT: SEX | LOVE, ROMANCE | FRIENDSHIP | MEMORIES | JUST SENTIMENT | FLOWERS | POETRY | PROSE | OCCASION RELATED | HUMOR | MASCULINE SPORTS | FUN

FIG. 5B2

OPTIMUM APPLICABILITY VALUES FOR SPECIFIC DESIGNS OF FIG. 6C

| | APPLICATION SCALES | | | | | | | | | | | | | | | | | | | | |
|---|---|---|---|---|---|---|---|---|---|---|---|---|---|---|---|---|---|---|---|---|---|
| | A | B | C | D | E | F | G | H | I | J | K | L | M | N | O | P | Q | R | S | T | U |
| DESIGN 1 | 100 | 50 | 0 | 0 | 0 | 0 | 0 | 100 | 0 | 80 | 0 | 0 | 80 | 100 | 0 | 75 | 75 | 75 | 40 | 80 | 75 |
| DESIGN 2 | 0 | 0 | 0 | 0 | 100 | 0 | 80 | 100 | 0 | 75 | 50 | 0 | 75 | 50 | 0 | 95 | 75 | 75 | 75 | 70 | 0 |
| DESIGN 3 | 50 | 0 | 75 | 75 | 0 | 0 | 50 | 100 | 0 | 75 | 50 | 0 | 75 | 50 | 0 | 85 | 50 | 50 | 60 | 70 | 20 |
| DESIGN 4 | 100 | 50 | 0 | 0 | 0 | 0 | 50 | 20 | 20 | 70 | 100 | 0 | 70 | 100 | 0 | 40 | 10 | 40 | 80 | 15 | 100 |
| DESIGN 5 | 0 | 0 | 100 | 75 | 0 | 0 | 30 | 0 | 0 | 70 | 50 | 0 | 70 | 50 | 0 | 85 | 60 | 65 | 40 | 70 | 30 |
| DESIGN 6 | 75 | 25 | 100 | 50 | 25 | 75 | 50 | 25 | 25 | 80 | 50 | 30 | 80 | 50 | 30 | 55 | 45 | 40 | 50 | 75 | 60 |
| DESIGN 7 | 90 | 20 | 100 | 100 | 85 | 30 | 60 | 70 | 60 | 80 | 50 | 20 | 80 | 50 | 20 | 55 | 75 | 55 | 40 | 95 | 70 |
| DESIGN 8 | 100 | 50 | 0 | 0 | 0 | 0 | 50 | 20 | 90 | 80 | 50 | 0 | 80 | 50 | 30 | 45 | 15 | 40 | 70 | 30 | 90 |
| DESIGN 9 | 0 | 0 | 100 | 0 | 0 | 0 | 40 | 25 | 25 | 80 | 50 | 30 | 80 | 50 | 30 | 35 | 40 | 40 | 40 | 60 | 40 |
| DESIGN 10 | 100 | 50 | 75 | 80 | 50 | 25 | 40 | 30 | 80 | 80 | 100 | 0 | 80 | 50 | 50 | 55 | 75 | 60 | 40 | 60 | 95 |

FIG. 6B

<u>SUMMARY DESCRIPTIONS OF DESIGNS STORED IN SYSTEM DATA FILES</u>

DESIGN 1: BIRTHDAY CARD FOR WIFE; TENDER THOUGHTS EXPRESSED AS NON-HUMOROUS PROSE

DESIGN 2: VALENTINE CARD (TO ANYONE) WITH HUMOROUS SEXUAL INNUENDO

DESIGN 3: A CUTE INVITATION TO DINNER AND A PLEASANT EVENING. RECIPIENT UNDESIGNATED

DESIGN 4: AN INSULTING BIRTHDAY CARD TO A MALE

DESIGN 5: "THANKS FOR A GREAT EVENING. HOPE TO SEE YOU AGAIN"

DESIGN 6: "THINKING OF YOU"; FLORAL DESIGN; NO TEXT

DESIGN 7: "YOU MEAN SO MUCH"; FLORAL DESIGN; SENTIMENTAL POEM

DESIGN 8: BIRTHDAY CARD; HUMOROUS PLAY ON GETTING OLDER

DESIGN 9: "HAVEN'T HEARD FROM YOU; WHY DON'T YOU WRITE? "

DESIGN 10:"YOU'RE THE GREATEST. WE LOVE YOU". MASCULINE DESIGN WITH GOLF THEME

FIG. 6C $$G.O.F._{aa} = \frac{\sqrt{\sum_{i=1}^{p} \sum_{j=1}^{m} (DMV_{ij} - OAV_{i-aa})^2}}{\sum_{i=1}^{p} n_{i-aa} \sum_{i=1}^{p} m_i}$$

WHERE $G.O.F._{aa}$ = GOODNESS OF FIT MEASUREMENT FOR PRODUCT DESIGN aa $DMV_{ij}$ = DMV VALUE(S) CORRESPONDING TO CRITERION OPTION j IN DIMENSION i, $j = 1 \rightarrow m$; $i = 1 \rightarrow p$ $OAV_{i-aa}$ = OAV VALUE(S) FOR DESIGN aa FOR DIMENSION i, $i = 1 \rightarrow p$ $n_{i-aa}$ = NUMBER OF OAVs FOR DESIGN aa IN DIMENSION i $m_i$ = NUMBER OF DMVs IN DIMENSION i

FIG. 8

$$G.O.F._{aa} = \frac{\sqrt{\sum_{i=1}^{p} \sum_{j=1}^{m} W.F._i \left[(DMV_{ij} - OAV_{i-aa}) S.F._i\right]^2}}{\sum_{i=1}^{p} n_{i-aa} \sum_{i=1}^{p} m_i}$$

WHERE $G.O.F._{aa}$ = GOODNESS OF FIT MEASUREMENT FOR PRODUCT DESIGN aa $m_i$ = NUMBER OF DMV VALUES IN DIMENSION i, $i = 1 \rightarrow p$ $DMV_{ij}$ = DMV VALUE(S) CORRESPONDING TO CRITERION OPTION j IN DIMENSION i, $j = 1 \rightarrow m$ $OAV_{i-aa}$ = OAV VALUE(S) FOR DESIGN aa FOR DIMENSION i, $i = 1 \rightarrow p$ $W.F_i$ = WEIGHTING FACTOR FOR DIMENSION i $S.F_i$ = SCALING FACTOR FOR DIMENSION i $n_{i-aa}$ = NUMBER OF OAVs

FIG. 9

CHOOSE CUSTOMIZING OPTION:

A. WANT TO CREATE AND WRITE MY OWN CARD ON A BLANK SHEET

OR.

B. WANT TO ADD MY OWN CUSTOMIZATION TO A SUITABLE CARD IN ONE OR MORE OF THE FOLLOWING WAYS:

1. WANT TO ADD AN OPENING GREETING AND/OR RECIPIENT'S NAME IN AVAILABLE BLANK SPACE ON FIRST PAGE
2. WANT TO DELETE THE GREETING NOW THERE AND REPLACE WITH AN OPENING GREETING OF MY OWN ON FIRST PAGE
3. WANT TO ADD MY OWN TEXT ON ONE OF INSIDE PAGES
4. WANT TO DELETE ALL INSIDE TEXT AND REPLACE WITH TEXT OF MY OWN CREATION
5 WANT TO ADD CLOSING GREETING PLUS MY NAME ON INSIDE PAGE
6. WANT TO ADD MY CREATIVE BRAND NAME ON BACK COVER

OR.

C. WANT TO FILL IN PERSONALIZING INFORMATION IN OPTIONAL LOCATIONS WHICH WILL BE DESIGNATED ON THE CARD I SELECT

OR.

D. WANT TO REVIEW THESE OPTIONS AGAIN AFTER I HAVE SEEN SUITABLE DESIGNS AND SELECTED A DESIGN I LIKE

FIG. 16

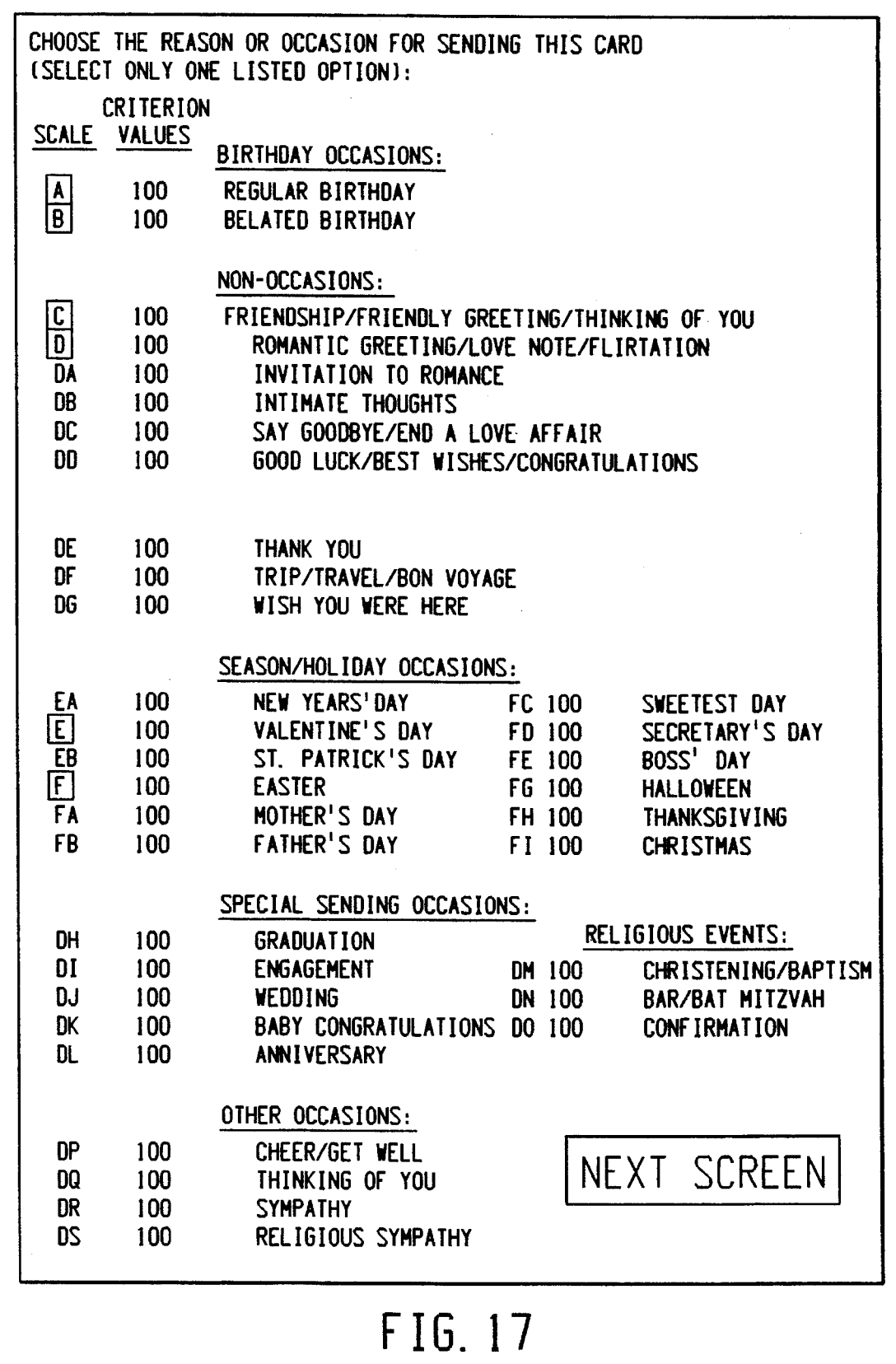

CHOOSE THE REASON OR OCCASION FOR SENDING THIS CARD
(SELECT ONLY ONE LISTED OPTION):

| SCALE | CRITERION VALUES | |
|---|---|---|
| | | **BIRTHDAY OCCASIONS:** |
| A | 100 | REGULAR BIRTHDAY |
| B | 100 | BELATED BIRTHDAY |
| | | **NON-OCCASIONS:** |
| C | 100 | FRIENDSHIP/FRIENDLY GREETING/THINKING OF YOU |
| D | 100 | ROMANTIC GREETING/LOVE NOTE/FLIRTATION |
| DA | 100 | INVITATION TO ROMANCE |
| DB | 100 | INTIMATE THOUGHTS |
| DC | 100 | SAY GOODBYE/END A LOVE AFFAIR |
| DD | 100 | GOOD LUCK/BEST WISHES/CONGRATULATIONS |
| DE | 100 | THANK YOU |
| DF | 100 | TRIP/TRAVEL/BON VOYAGE |
| DG | 100 | WISH YOU WERE HERE |

SEASON/HOLIDAY OCCASIONS:

| | | | | | |
|---|---|---|---|---|---|
| EA | 100 | NEW YEARS' DAY | FC | 100 | SWEETEST DAY |
| E | 100 | VALENTINE'S DAY | FD | 100 | SECRETARY'S DAY |
| EB | 100 | ST. PATRICK'S DAY | FE | 100 | BOSS' DAY |
| F | 100 | EASTER | FG | 100 | HALLOWEEN |
| FA | 100 | MOTHER'S DAY | FH | 100 | THANKSGIVING |
| FB | 100 | FATHER'S DAY | FI | 100 | CHRISTMAS |

| | | **SPECIAL SENDING OCCASIONS:** | | | **RELIGIOUS EVENTS:** |
|---|---|---|---|---|---|
| DH | 100 | GRADUATION | | | |
| DI | 100 | ENGAGEMENT | DM | 100 | CHRISTENING/BAPTISM |
| DJ | 100 | WEDDING | DN | 100 | BAR/BAT MITZVAH |
| DK | 100 | BABY CONGRATULATIONS | DO | 100 | CONFIRMATION |
| DL | 100 | ANNIVERSARY | | | |

OTHER OCCASIONS:

| | | |
|---|---|---|
| DP | 100 | CHEER/GET WELL |
| DQ | 100 | THINKING OF YOU |
| DR | 100 | SYMPATHY |
| DS | 100 | RELIGIOUS SYMPATHY |

NEXT SCREEN

FIG. 17

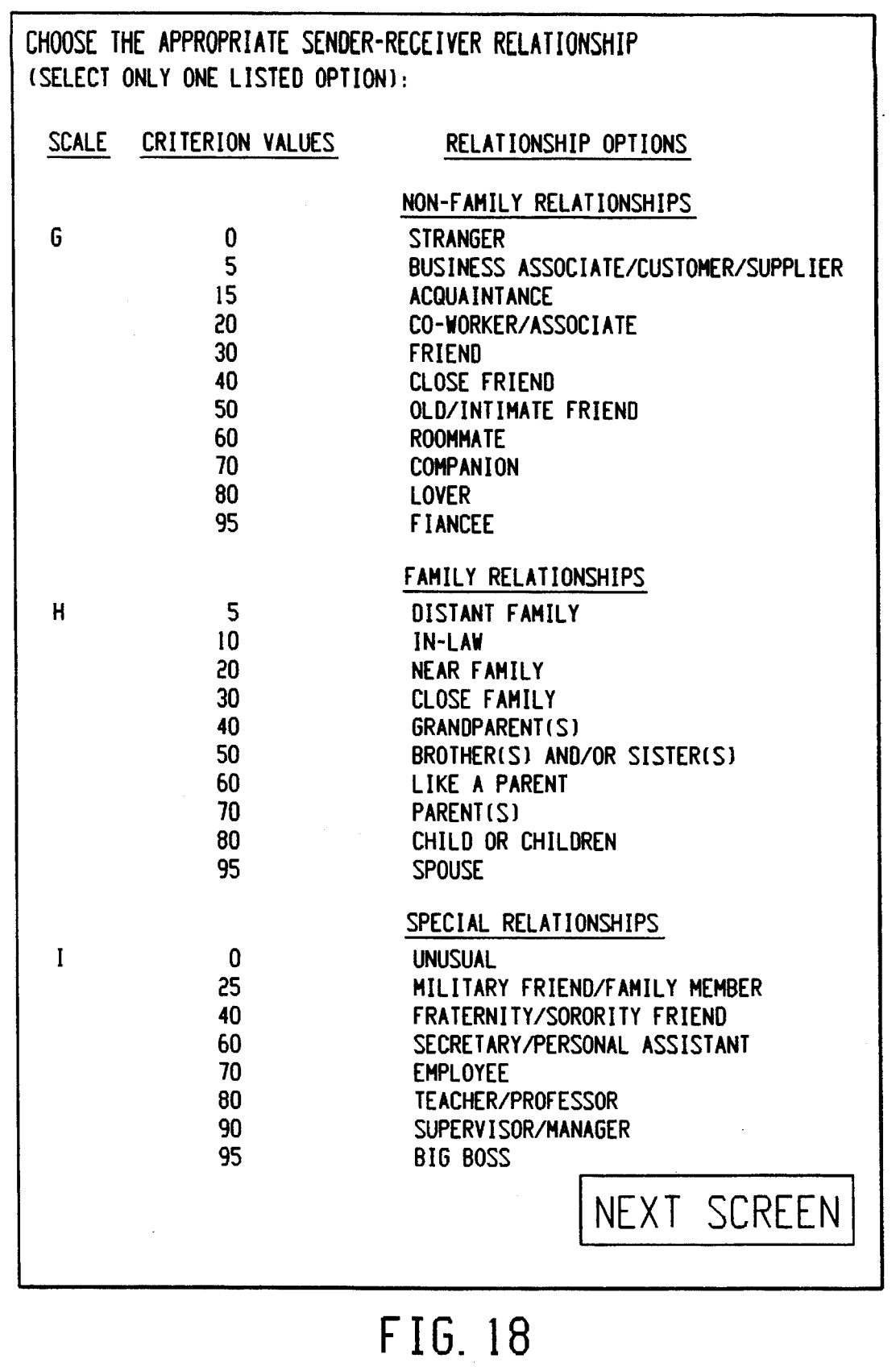

CHOOSE THE APPROPRIATE SENDER-RECEIVER RELATIONSHIP
(SELECT ONLY ONE LISTED OPTION):

| SCALE | CRITERION VALUES | RELATIONSHIP OPTIONS |
|---|---|---|
| | | NON-FAMILY RELATIONSHIPS |
| G | 0 | STRANGER |
| | 5 | BUSINESS ASSOCIATE/CUSTOMER/SUPPLIER |
| | 15 | ACQUAINTANCE |
| | 20 | CO-WORKER/ASSOCIATE |
| | 30 | FRIEND |
| | 40 | CLOSE FRIEND |
| | 50 | OLD/INTIMATE FRIEND |
| | 60 | ROOMMATE |
| | 70 | COMPANION |
| | 80 | LOVER |
| | 95 | FIANCEE |
| | | FAMILY RELATIONSHIPS |
| H | 5 | DISTANT FAMILY |
| | 10 | IN-LAW |
| | 20 | NEAR FAMILY |
| | 30 | CLOSE FAMILY |
| | 40 | GRANDPARENT(S) |
| | 50 | BROTHER(S) AND/OR SISTER(S) |
| | 60 | LIKE A PARENT |
| | 70 | PARENT(S) |
| | 80 | CHILD OR CHILDREN |
| | 95 | SPOUSE |
| | | SPECIAL RELATIONSHIPS |
| I | 0 | UNUSUAL |
| | 25 | MILITARY FRIEND/FAMILY MEMBER |
| | 40 | FRATERNITY/SORORITY FRIEND |
| | 60 | SECRETARY/PERSONAL ASSISTANT |
| | 70 | EMPLOYEE |
| | 80 | TEACHER/PROFESSOR |
| | 90 | SUPERVISOR/MANAGER |
| | 95 | BIG BOSS |

NEXT SCREEN

FIG. 18

CHOOSE THE APPROPRIATE TRAITS OF THE SENDER AND RECEIVER OF THE CARD:

| SCALE | CRITERION VALUE | RECIPIENT TRAITS |
|---|---|---|
| | | AGE |
| J | 5 | 4-7 |
| | 20 | 8-11 |
| | 30 | 12-15 |
| | 35 | SWEET SIXTEEN |
| | 50 | 17-20 |
| | 70 | 21-30 |
| | 80 | 31-45 |
| | 90 | 45-64 |
| | 95 | 65 + |
| | | GENDER |
| K | 0 | FEMALE |
| | 25 | MOSTLY FEMALE GROUP |
| | 50 | EITHER, COUPLE, FAMILY, OR MIXED GROUP |
| | 75 | MOSTLY MALE GROUP |
| | 100 | MALE |
| | | PLURALITY |
| L | 0 | ONE PERSON |
| | 30 | TWO PEOPLE |
| | 50 | COUPLE OR FAMILY |
| | 75 | SMALL GROUP |
| | 100 | LARGE GROUP |

MATCH TO FIG. 19B

FIG. 19A

MATCH TO FIG. 19A

FIG. 20A

CHOOSE THE DESIGN THEME AND STYLE OF CARD YOU PREFER:
SELECT ANY OF THE FOLLOWING CHOICES:

| SCALE | CRITERION VALUES | |
|---|---|---|
| P | | SENTIMENT THEMES |
| | 0 | GET LOST |
| | 10 | LET'S BREAK OFF |
| | 15 | NOT HAPPY |
| | 25 | COOL GREETING |
| | 30 | CASUAL GREETING |
| | 35 | HI/HELLO/HOW ARE YOU? |
| | 45 | FRIENDLY NOTE |
| | 50 | WARM NOTE |
| | 55 | THINKING OF YOU |
| | 60 | MISSING YOU |
| | 70 | LOVE YOU |
| | 75 | LOVE NOTE |
| | 85 | FLIRTATIOUS NOTE |
| | 100 | LUSTY THOUGHTS |
| Q | | COMPLIMENTARY QUALITY |
| | 5 | PLAYFUL INSULT |
| | 15 | FUN PUT-DOWN |
| | 40 | NICE THOUGHTS |
| | 50 | COMPLIMENTARY THOUGHTS |
| | 60 | DIRECT COMPLIMENT |
| | 75 | STRONG COMPLIMENT/YOU'RE GOOD |
| | 95 | FLATTERING NOTE/YOU'RE GREATEST |

| SCALE | CRITERION VALUES | |
|---|---|---|
| S | | HUMOR CONTENT |
| | 0 | SAD |
| | 30 | SOBER/FORMAL |
| | 40 | SERIOUS |
| | 50 | CHEERFUL THOUGHTS |
| | 60 | CUTE |
| | 70 | MILD HUMOR/WORD FUN |
| | 80 | FUNNY |
| | 90 | VERY FUNNY |
| | 100 | OUTRAGEOUS/OFF-THE-WALL |
| T | | ENDEARMENT STYLE |
| | 0 | BITING |
| | 15 | SARCASTIC |
| | 30 | SMART ALECK |
| | 40 | PLAYFUL PUTDOWN |
| | 60 | IMPERSONAL |
| | 70 | PERSONAL |
| | 85 | ENDEARING INTIMACY |
| | 100 | SWEET SENTIMENTALITY |

MATCH TO FIG. 20B

MATCH TO FIG. 20A

FIG. 21A

SCREEN A: SELECT SENDING OCCASION:

| | | | | | |
|---|---|---|---|---|---|
| SELECTION OPTIONS: | BIRTHDAY | FRIENDSHIP | ROMANTIC LOVE | VALENTINE | EASTER |
| SCALES AND VALUES: | A-100 | C-100 | D-100 | E-100 | F-100 |

SCREEN B: SELECT BIRTHDAY SUB-OPTIONS:

| | | | | | | | | |
|---|---|---|---|---|---|---|---|---|
| SELECTION OPTIONS: | ROMANTIC | TRADITIONAL | MILESTONES | GROUP | FAMILY | HUMOR | BELATED | KIDS |
| SCALES AND VALUES: | G-75 | Q-60 | J-50 | G-35 | | S-75 | B-100 | J-15 |
| | J-60 | P-50 | K-50 | L-0 | | | | |
| | L-0 | T-65 | L-0 | M-80 | | | | |
| | M-60 | U-40 | P-50 | N-50 | | | | |
| | O-0 | | Q-70 | O-100 | | | | |
| | P-80 | | R-50 | P-40 | | | | |
| | T-75 | | | | | | | |
| | U-15 | | | | | | | |

SELECT BIRTHDAY-ROMANTIC SUB-SUB-OPTIONS:

| | | |
|---|---|---|
| SELECTION OPTIONS: | LOVE NOTES | LUSTY THOUGHTS |
| SCALES AND VALUES: | P-85 | P-100 |

SELECT BIRTHDAY-ROMANTIC-LUSTY THOUGHTS SUB-SUB-OPTIONS:

| | | |
|---|---|---|
| SELECTION OPTIONS: | MALE | FEMALE |
| SCALES AND VALUES: | K-100 | K-0 |
| | L-0 | L-0 |

MATCH TO FIG. 21B

MATCH TO FIG. 21A

SELECT BIRTHDAY FAMILY SUB-SUB-OPTIONS:

| SELECTION OPTIONS: | SONS | DAUGHTERS | PARENTS | GRANDPARENTS | BROTHERS | SISTERS |
|---|---|---|---|---|---|---|
| SCALES AND VALUES: | H-80 | H-80 | H-70 | H-30 | H-45 | H-45 |
| | K-100 | K-0 | K-50 | K-50 | K-100 | K-0 |
| | L-25 | L-25 | L-25 | L-25 | L-25 | L-25 |

SELECT BIRTHDAY HUMOROUS SUB-SUB-OPTIONS:

| SELECTION OPTIONS: | GENERAL | MALE | FEMALE | OFF-THE-WALL |
|---|---|---|---|---|
| SCALES AND VALUES: | K-50 | K-100 | K-0 | S-100 |
| | S-70 | S-80 | S-60 | |

SCREEN C: SELECT FRIENDSHIP SUB-OPTIONS:

| SELECTION OPTIONS: | FRIENDSHIP | ROMANTIC | MISSING YOU | SORRY | GIRL-TALK |
|---|---|---|---|---|---|
| SCALES AND VALUES: | TRADITIONAL | G-75 | P-70 | R-75 | J-70 |
| | P-40 | | G-50 | G-60 | K-0 |
| | G-50 | | | | L-0 |
| | HUMOROUS | | | | M-70 |
| | S-65 | | | | N-0 |
| | G-50 | | | | P-50 |
| | | | | | U-20 |

SCREEN D: SELECT FRIENDSHIP-ROMANTIC SUB-SUB-OPTIONS:

| SELECTION OPTIONS: | MISS YOU | WORK OUT | LOVE YOU | MESS-AROUND | APPRECIATE | INVITES |
|---|---|---|---|---|---|---|
| SCALES AND VALUES: | P-70 | P-30 | P-75 | P-90 | Q-75 | P-90 |
| | | | | U-0 | R-50 | U-100 |

FIG. 21B

FIG. 22A

CUSTOMER 1

SELECTION CRITERIA:

BIRTHDAY; GOOD FRIEND; TO A SINGLE FEMALE, AGE 50, FROM A SINGLE FEMALE AGE 50; WARM; COMPLIMENTARY; GLAD YOU'RE MY FRIEND; CHEERFUL, PERSONAL; MEMORIES

| | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| SCALE VALUES: | 100 | - | - | - | - | - | 50 | - | - | 90 | 0 | 0 | 90 | 0 | 0 | 50 | 50 | 40 | 50 | 70 | 45 |
| SCALING FACTORS: f(OCCASION) | | | | | | | 2 | | | 1 | 0.5 | 1 | 1 | 1 | 1 | 1 | 2 | 1 | 1 | 1 | 1.5 |
| WEIGHTING FACTORS: f(OCCASION) | | | | | | | 2 | | | 1 | 1.5 | 1 | 1 | 1.5 | 1 | 3 | 1 | 1 | 2 | 1 | 0.5 |

SCALES:

| DESIGN 1 | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| APPLICABILITY VALUES: | 100 | 0 | 0 | 0 | 0 | 0 | 0 | 100 | 0 | 80 | 0 | 0 | 90 | 100 | 0 | 75 | 0 | 75 | 40 | 80 | 75 |
| DIFFERENCES: | 0 | | | | | | 50 | | | 10 | 0 | 0 | 0 | 100 | 0 | 25 | 50 | 35 | 10 | 10 | 30 |
| S.F. x DIFFS.: | 0 | | | | | | 100 | | | 10 | 0 | 0 | 0 | 50 | 0 | 25 | 100 | 35 | 10 | 10 | 45 |
| (S.F. x DIFFS.)$^2$: | 0 | | | | | | 10000 | | | 100 | 0 | 0 | 0 | 2500 | 0 | 625 | 10000 | 1225 | 100 | 100 | 2025 |
| W.F.(S.F. x DIFFS.)$^2$: | 0 | | | | | | 20000 | | | 100 | 0 | 0 | 0 | 3750 | 0 | 1875 | 10000 | 1225 | 200 | 100 | 1012 |

$$\sum \text{W.F.}(\text{S.F.} \times \text{DIFFS.})^2 = 36{,}912$$

$$\sqrt{\sum \text{W.F.}(\text{S.F.} \times \text{DIFFS.})^2} = 192.1$$

$$1/14\sqrt{\sum \text{W.F.}(\text{S.F.} \times \text{DIFFS.})^2} = 13.7$$ CORRELATION VALUE FOR DESIGN NUMBER 1

MATCH TO FIG. 22B

MATCH TO FIG. 22A

SCALES:

| DESIGN 6 | A | B | C | D | E | F | G | H | I | J | K | L | M | N | O | P | Q | R | S | T | U |
|---|---|---|---|---|---|---|---|---|---|---|---|---|---|---|---|---|---|---|---|---|---|
| APPLICABILITY VALUES: | 75 | 0 | 0 | 0 | 0 | 0 | 50 | 0 | 0 | 80 | 50 | 30 | 80 | 50 | 30 | 55 | 45 | 40 | 50 | 75 | 60 |
| DIFFERENCES: | 25 | | | | | | 0 | | | 10 | 50 | 30 | 10 | 50 | 30 | 5 | 5 | 0 | 0 | 5 | 15 |
| S.F. x DIFFS.: | 25 | | | | | | 0 | | | 10 | 25 | 30 | 10 | 25 | 30 | 5 | 10 | 0 | 0 | 5 | 22 |
| (S.F. x DIFFS.)$^2$: | 625 | | | | | | 0 | | | 100 | 625 | 900 | 100 | 625 | 900 | 25 | 100 | 0 | 0 | 25 | 506 |
| W.F.(S.F. x DIFFS.)$^2$: | 625 | | | | | | 0 | | | 100 | 1250 | 900 | 100 | 1250 | 900 | 75 | 100 | 0 | 0 | 25 | 253 |

$$\sum W.F.(S.F. \times DIFFS.)^2 = 5350$$

$$\sqrt{\sum W.F.(S.F. \times DIFFS.)}^2 = 73.1$$

$$1/14\sqrt{\sum W.F.(S.F. \times DIFFS.)}^2 = 5.2$$ CORRELATION VALUE FOR DESIGN NUMBER 6

FIG. 22B

CUSTOMER NUMBER 1 SELECTION CRITERIA:

OCCASION: SENDER-RECIPIENT RELATIONSHIP: SENDER/RECIPIENT TRAITS:
BIRTHDAY, GOOD FRIEND, TO SINGLE FEMALE, AGE 50, FROM SINGLE FEMALE, AGE 50

THEME, STYLE, CONTENT PREFERENCE:
WARM, COMPLIMENTARY, GLAD YOU'RE MY FRIEND, CHEERFUL, PERSONAL, MEMORIES

| DESIGN NUMBER | DESCRIPTION | CORRELATION VALUES |
|---|---|---|
| 6 | "THINKING OF YOU", FLORAL DESIGN, NO TEXT | 5.2 |
| 7 | "YOU MEAN SO MUCH", FLORAL DESIGN, SENTIMENTAL POEM | 6.9 |
| 3 | A CUTE INVITATION TO DINNER AND A PLEASANT EVENING | 7.8 |
| 8 | HAPPY BIRTHDAY; HUMOROUS PLAY ON GETTING OLDER | 8.9 |
| >>>>>>>>>>>>> | ESTABLISHED SUITABILITY THRESHOLD VALUE | 9.0 |
| 10 | "YOU'RE THE GREATEST", "WE LOVE YOU", MASC. GOLF THEME | 9.3 |
| 5 | "THANKS FOR GREAT EVENING", "HOPE TO SEE YOU AGAIN" | 10.8 |
| 4 | A PLAYFULLY INSULTING BIRTHDAY CARD FOR A MALE | 13.3 |
| 1 | BIRTHDAY CARD FOR WIFE; TENDER THOUGHTS; PROSE | 13.7 |
| 9 | "HAVEN'T HEARD FROM YOU. WHY DON'T YOU WRITE" | 14.0 |
| 2 | VALENTINE CARD (TO ANYONE); HUMOROUS SEXUAL INNUENDO | 14.2 |

FIG. 23

METHOD AND APPARATUS FOR STORING AND SELECTIVELY RETRIEVING PRODUCT DATA BY CORRELATING CUSTOMER SELECTION CRITERIA WITH OPTIMUM PRODUCT DESIGNS BASED ON EMBEDDED EXPERT JUDGMENTS

FIELD OF THE INVENTION

This invention relates generally to machine ends methods for storing and selectively retrieving product data by correlating multiple customer selection criteria with optimum application judgments for product designs, and more particularly to such machines and methods wherein optimum product design applications are identified based on embedded expert judgments, and wherein identified product designs may be optionally modified by a customer.

1. Related Applications

The following U.S. patent application is incorporated herein by reference as if it had been fully set out:

Application Ser. No. 08/299,499, filed Sep. 1, 1994, entitled "METHOD AND APPARATUS FOR STORING AND SELECTIVELY RETRIEVING AND DELIVERING PRODUCT DATA BASED ON EMBEDDED EXPERT JUDGMENTS".

2. Background of the Invention

In a conventional retail, catalogue or library environment, customers are able to browse quickly and conveniently through large physical displays of products, while they inspect images, read words, listen to music and/or engage in other reviewing activities, until they find the specific product most suitable for their needs, interests or tastes. Under these conventional circumstances, customers can and do exercise their discriminating judgments and mental processes to make selections.

Recently, machines have been introduced that replace these large physical product displays by storing data relating to the products in magnetic or optical storage devices. An example of such machines are the social expression card machines which have become popular in recent years because they eliminate many of the problems associated with displaying numerous categories and sub-categories of social expression products. Some of these problems include the space required for displaying such a variety of social expression products, the resulting inventory requirements, and potential customer confusion resulting from the wide variety of social expression products from which to choose.

Social expression card machines typically comprise a computer operated vending machine, a display screen and a keyboard input terminal. A variety of available social expression product designs are stored in the computer. By means of the display screen, the computer prompts a customer to provide design criteria, or to select from a menu of computer-provided design criteria, indicative of appropriate social expression product designs for that customer. The keyboard input terminal is used to select or present the design criteria.

The computer uses the provided or selected design criteria to identify appropriate social expression product designs from the variety of available social expression product designs stored therein, generally by techniques which search for and identify those designs whose specified properties are exactly matched to customer input selection criteria. From these identified designs, the customer is directed to select one design, which the computer-driven vending machine prints on blank card stock and dispenses to the customer. In this manner, the customer can retrieve and review portions of the data on a video screen and audio system, by giving instructions on a keyboard or touchscreen that is connected by a programmed computer to the storage devices holding the data.

In simple situations involving such machines, the retrieval of the data is easily managed by conventional methods. For example, in the case of inputting or selecting a title, an object image or a few descriptive words can communicate to a machine all of the information required to specify the data file or files containing information that a customer wants to retrieve and display. Product characteristics are identified by allowable combinations of customer entered data. The computer can be programmed to retrieve the file or files that the user specifies, either by accessing known locations in a data storage device or by searching a data base to find the files whose identities match the descriptive words input by the customer. An example of a machine and method that accesses data from known storage locations is shown in U.S. Pat. No. 3,757,037 to Norman Bialek.

An example of a machine and method that searches a data base to find files whose identities match descriptive words is shown in U.S. Pat. No. 5,056,029 to Thomas G. Cannon. Cannon discloses a method wherein a customer is queried to elicit responses, in the form of occasion parameters, each of which relates to the customer's intended communication purpose. Greeting cards which may be selected for manufacture are stored, not physically, but in the form of design data held in high density magnetic or optical storage. The design data is identifiable by some unique combination of occasion parameters. Following the entry of customer responses, the computer retrieves and displays a set of product files which includes all of the stored product designs having occasion parameters which identically match those entered by the customer.

While the card vending machine shown in the Cannon patent provides an efficient means for storing many different types of social expression cards and for retrieving and displaying those card designs which match a customer's criteria, that machine, as well as other known machines, suffers from several drawbacks. One drawback is that the present machines can retrieve and display only those card designs that are identified by labels or descriptors that match exactly the criteria specified by the customer. However, some card designs can convey messages so broad in scope that they cannot be defined exclusively with selected descriptors. Because the present card vending machines are limited in this respect, they cannot use a large database of card designs to its fullest potential in meeting customer needs.

Indeed the number of card designs that must be stored in the database of one of the presently available machines is extremely large in relation to the number of different combinations of customer needs that it can meet. Because of the exact correspondence that is required between the card descriptors and the customer criteria, the number of stored card designs must be equal to the number of possible combinations of the various criteria that a customer can specify, multiplied by the average number of card designs that a vendor would want to display in response to a particular criteria combination. For instance, if the customer were given five possible criteria options to choose from within each of four card descriptors, 625 ($=5^4$) combinations of customer-selected criteria would be possible. If an average of ten card designs were made available for each combination, then a total of 6,250 card designs would be required in the database.

Another drawback is that such machines restrict the identities of product data files to fixed combinations of customer entry data. Many buyers of products and users of information cannot easily provide the exact word or words necessary for retrieving data either from known storage locations or by data base searching. The suitability of products, especially those that have rich aesthetic, intellectual or entertainment values, often cannot be described by single combinations of descriptive words. Thus, it may be necessary to provide the capability for several different forms or contents of customer data entry to access and retrieve a given product data file. Sometimes, a customer will be able to specify only a few criteria for products that he wants to view, while those products are identified by many descriptive words. Sometimes, a customer's specific criteria should be considered as suggestive only and a wide range of product files should be shown to him, some of which have very few, if any, of the exact criteria specified by the customer. Conversely, some data files may apply to and ought to be retrievable in response to many different sets of customer purposes, interests, needs or tastes.

But most important, on many occasions, a given product design may possess a very high degree of applicability with respect to one selection criterion input by a customer, but lower or very low degrees of applicability with respect to other criteria. In the general case where customer inputs comprise multiple selection criteria, these will possess varying degrees of closeness to the set of optimum application judgements used to describe the properties of stored product designs. The problem to be solved is to identify for retrieval some subset of designs whose overall suitability is judged to be the best.

In this sense, these files may have varying degrees of applicability or suitability for a particular set of customer criteria, rather than being designated as either suitable or not suitable. In such cases, the customer might prefer to see files of such varying suitability in the order of their anticipated suitabilities, from the highest to the lowest. Also, different customers may prefer to see different numbers of products having a range of suitabilities.

All of the aforementioned circumstances and needs can best be served by a system which, rather than seeking to identify products whose characteristics exactly match customer specifications, embodies one or more kinds of expert judgment data for the purpose of selectively retrieving some subset of best fitting or most appropriate products or product data files in response to customer data entry. It is therefore an object of the present invention to provide a method and machine for selecting products or services by correlating customer selection criteria with optimum product application judgments or designations to identify those products where the fit between specifications and optimum applications is best. It is a further object of the invention to provide a method and machine, such as a social expression card machine, for storing and identifying card designs, receiving customer selection criteria, correlating the customer selection criteria with optimum product design application designations, identifying and displaying product designs most likely to satisfy the customer selection criteria on an overall basis, modifying the displayed designs, and delivering the displayed designs, either modified or unmodified, in some tangible form.

These and other objects of the invention will become evident to those skilled in the art in view of the following description of the invention.

SUMMARY OF THE INVENTION

The present invention provides an improved method and machine by which a product or service, such as a social expression product, may store, retrieve, display, personalize, print and deliver to a customer a wide range of social expression product designs suitable for a broad spectrum of customer interests. The method for identifying and retrieving product designs to be displayed for customer selection follows the input of customer-related selection criteria and is based on the quantitative degree of correlation of product design characteristics (as represented by multiple optimum application designations) with the customer-entered selection criteria. This method permits individual product designs to be identified and retrieved for multiple applications to a wide range of customer needs and desires on a best fit basis, rather than on the basis of an exact match to a single or unique combination of customer needs.

Thus, given the limited library of stored product designs, a vending machine may retrieve subsets of designs from the library which are suitable for application to a much larger number of combinations of customer selection criteria than would otherwise be possible. In addition, the machine may respond to any given combination of customer-entered selection criteria by displaying many product designs in descending order of applicability as determined by the correlation method, thereby providing a large and diverse selection of applicable product designs for customer examination and choice.

The inventive machine of the present invention stores a plurality of product or service designs in a design data file, and a plurality of descriptors are stored in a selection criteria data file for each of the plurality of product or service designs. Each of the descriptors represents an application scale. An expert-predetermined optimum applicability value is stored in a design applicability data file for each combination of the application scales and the product or service designs.

A customer is presented with selection criteria options for one or more application scales. Based on the selection criteria options chosen by the customer, customer preference values for one or more application scales for each product or service design are stored in the selection criteria data file. These customer preference values are assigned to application scales where such values correspond to the selection criteria options chosen by the customer. The selection criteria options chosen by the customer need not correspond identically with particular application scales. Instead, the selection criteria options chosen by the customer may be translated into either one or a plurality of preference values on one or more associated application scales for each product or service design.

A correlation algorithm is utilized to quantitatively correlate each of the customer preference values with corresponding expert-predetermined optimum applicability values to calculate an overall or average suitability rating for each of the product or service designs based on the customer-chosen selection criteria options. A group of identified product or service designs is displayed for the customer based on the average suitability ratings for those identified product or service designs.

The correlation algorithm quantitatively correlates the customer preference values with the corresponding expert-predetermined optimum applicability values to calculate an overall or average suitability rating for each of the product or service data files in storage by first calculating the differences between each pair of the customer preference values and the corresponding expert-predetermined optimum applicability values for each of the application scales in which a corresponding pair exists. Then each of the calculated differences is squared, because the differences between the customer preference values and the corresponding expert-predetermined optimum applicability values may be calculated as either positive or negative values and to cause an exponential effect of difference magnitudes on the goodness of fit calculation. The squared differences are then summed, and the square root of the summed squared differences is calculated to obtain a gross suitability rating for each product design. This gross suitability rating is averaged by the number of calculated differences to obtain the average suitability rating for each product design.

The operation of the algorithm may be modified by the introduction of scaling factors for each of the application scales by which each of the calculated differences on a given scale is multiplied prior to squaring the calculated differences. These scaling factors used to multiply the calculated differences may be used to control the magnitude of exponential effect associated with calculated differences on any scale. Further modification of the algorithm may include the introduction of weighting factors by which each of squared differences is multiplied prior to summing the squared differences. These weighting factors may be used to control the impact of any scale on the overall goodness of fit calculations.

A predetermined minimum threshold value may be established for the average suitability rating. If the above calculations result in an average suitability rating which does not meet the minimum threshold value, the differences between each pair of the customer preference values and the corresponding expert-predetermined optimum applicability values may be re-calculated using all but a select group of application scales in which a corresponding pair exists. In this manner, application scales which may disproportionately skew the average suitability rating may be ignored when carrying out the required calculations. In effect, the goodness of fit algorithm can be constructed to ignore successively those application scales considered to be least important to customer interests while searching the product files to find potentially suitable items.

In the case of product designs, the machine and method solicit the customer to select one of the identified product designs and verify the selection, and then display the selected design. The selected design may then be modified by the customer. The selected or modified product design is then dispensed to the customer in the form of a printed product, or stored on a suitable storage medium for later delivery.

BRIEF DESCRIPTION OF THE DRAWINGS

FIGS. 4, 5A, 6A, and 7 are block diagrams of select data files which make up the data storage devices of FIG. 3;

FIGS. 5B1–5B2 and 6B shows examples of data contained in the data files of FIGS. 5A and 6A, respectively;

FIG. 6C lists summaries of examples of card designs which are stored in the data files and to which the optimum applicability values of FIG. 6B apply;

FIGS. 8 and 9 are examples of algorithms which may be used by the machine of FIG. 1 for correlating customer selection criteria with optimum product and service designs;

FIGS. 16, 17, 18, 19A/19B, and 20A/20B are examples of display screens presented to a customer during operation of the process of FIGS. 11 and 12 (the scales and values shown represent data associated with customer selected criterion options and are not visible on the display screens, but are stored in memory as shown in FIGS. 4–7);

FIGS. 21A/21B are is an example of an alternate simplified set of display screens presented to a customer during operation of the process of FIGS. 11 and 12;

FIGS. 22A/22B show an example of the calculations performed by the computer using the algorithm of FIG. 9, as applied to a specific set of customer selection criteria and to designs 1 and 6 of the illustrative set of design applicability values shown in FIG. 6B;

FIG. 23 illustrates a table of correlation values calculated in accordance with the algorithm of FIG. 9 for the various designs listed in FIG. 6C in response to a customer data entry set.

DETAILED DESCRIPTION OF A PREFERRED EMBODIMENT

A. System Components

Figure 1:
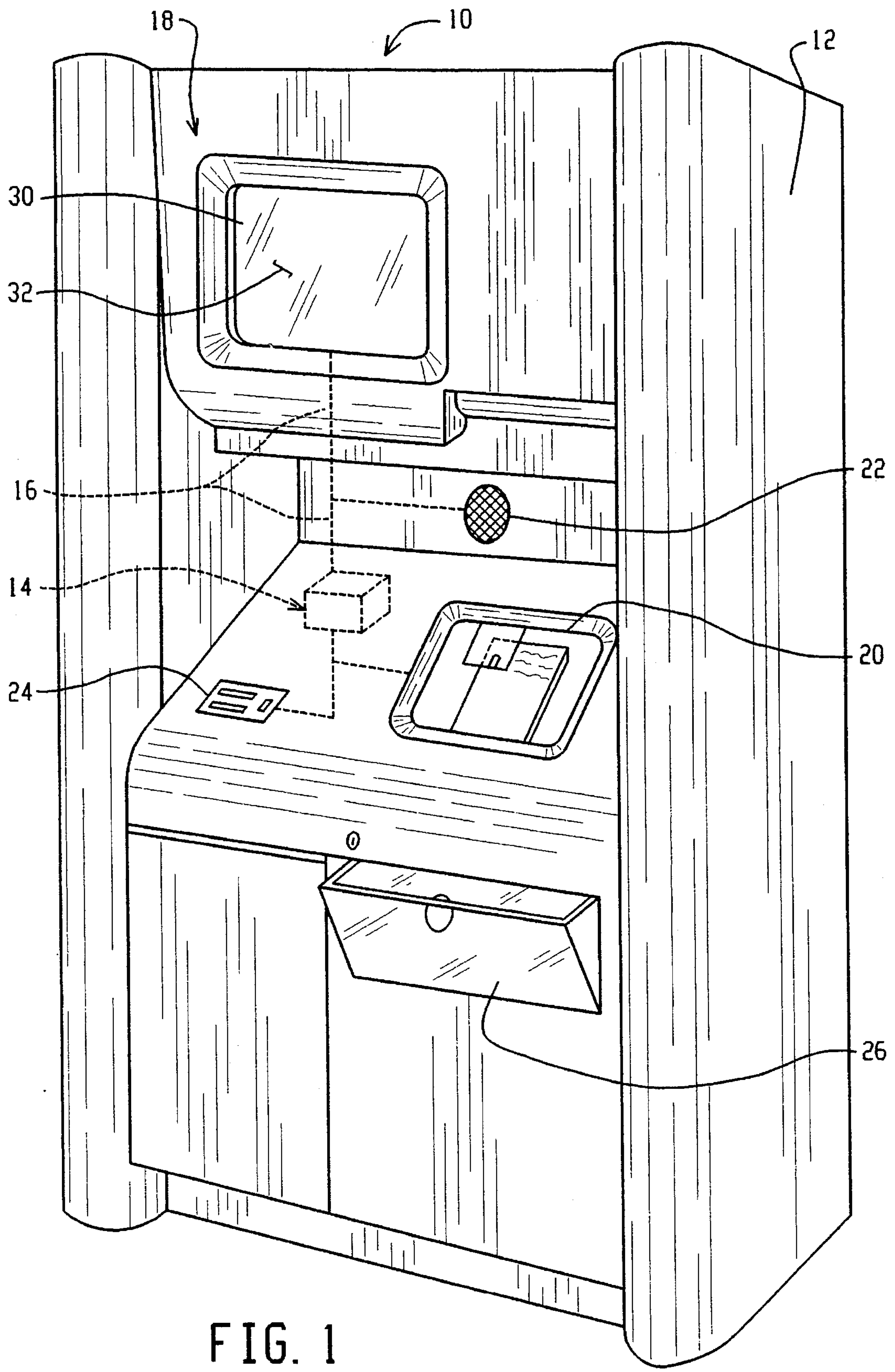
FIG. 1 is a perspective view of one embodiment of a machine, for selecting products or services by correlating customer selection criteria with optimum product and service designs, constructed according to the principles of the present invention.

A machine 10 for storing and selectively retrieving product data by correlating customer selection criteria with optimum product design applicabilities based on embedded expert judgments is shown in FIG. 1. The machine 10, which is merely one embodiment constructed according to the principles of the present invention, is used to store and selectively retrieve social expression products (e.g. greeting cards) by correlating customer selection criteria with optimum greeting card design application values stored therein. It will be understood by others skilled in the art, however, that the principles of the present invention may be applied to other types of machines for selecting other types of products or services. The following detailed description, however, will relate to the greeting card machine 10 shown in FIG. 1.

The machine 10 assumes the form of a kiosk designed for on-site storage, retrieval, modification and delivery of greeting cards in a retail store. For illustration purposes, a single machine 10 is shown for performing all of these functions at one location. However, various parts of the system, such as data storage devices and printers, may be placed at locations remote from the machine 10, either within the retail store or at a distant control center.

The greeting cards may be delivered from the kiosk in printed form. Alternatively, only the retrieval and modification of the card design may take place at the kiosk. The retrieved or modified card designs may then be stored on a magnetic disk and either delivered to the customer, or the stored design data may be sent directly to the customer's home computer, allowing him to produce the card on his own printer or plotter. In general, the method which characterizes this invention does not require that the various components such as data entry device, the monitor, the computer, and the printer be located within the same housing. Any of the components may be remote from the others with data flow between them carried by any appropriate form of telecommunications.

The machine 10 includes an enclosure 12 in which is housed a computer 14. The computer 14 is provided with memory or data storage 15 associated therewith (see FIG. 2A) and is electrically connected by means of wiring 16 (shown in phantom in FIG. 1) to an input/output (I/O) terminal 18, a printer device 20, an audio system or loudspeaker 22 and a payment device 24. A bin or dispensing tray 26 provides means for delivering a selected or modified greeting card to a customer. A paper tray 28 (see FIG. 2A) provides a supply of paper to the printer device 20.

The I/O terminal 18 in the embodiment of the invention is preferably a video monitor 30 provided with a touch screen overlay 32. The video monitor 30 provides the means to query the customer to obtain customer selection criteria, and the touchscreen overlay 32 provides the means for the customer to enter responses to these computer-generated queries. The video monitor 30 is also used to display optimum greeting card designs and greeting card component designs to the customer which are identified after the computer correlates the customer selection criteria with stored card designs. Other forms of data input devices are contemplated in place of the touch screen overlay 32, for example, a keyboard, a stylus in combination with a screen which recognizes contact thereof, or a mouse. These alternative forms of input devices may also be used in addition to, instead of in lieu of, the touch screen overlay 32. Input and display hardware and software 31 (see FIG. 2A) provide means for communications between the computer 14, the video monitor 30 and the touchscreen 32.

Figure 2A:
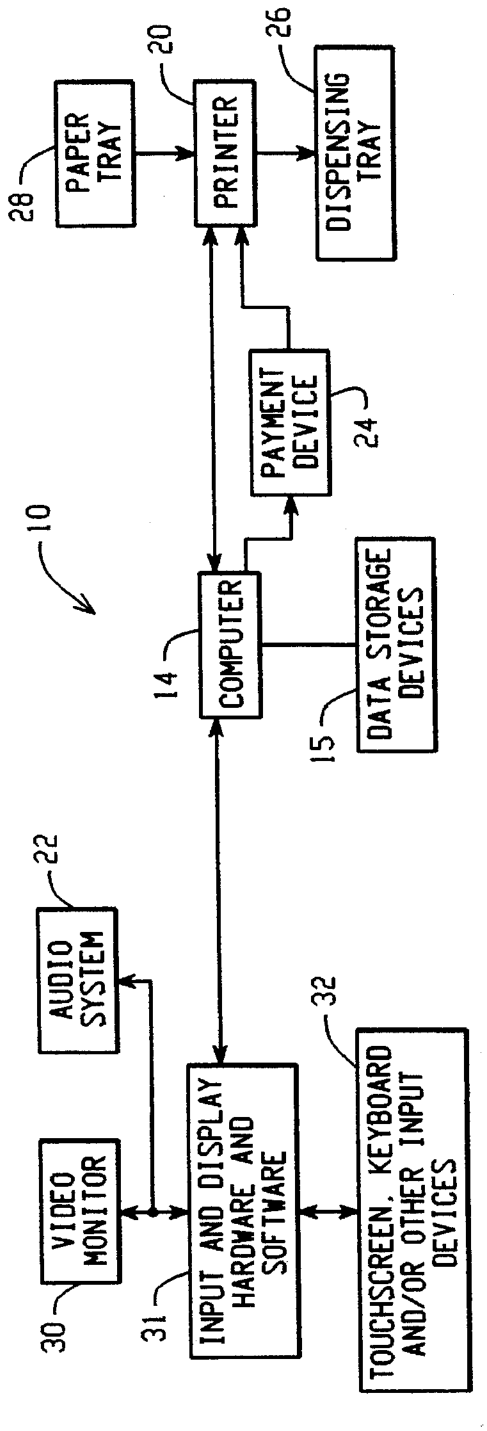
FIG. 2A is a system block diagram of the machine of FIG. 1.

FIG. 2A represents a system block diagram of the machine of FIG. 1. However, as explained above, although the present invention is described in terms of a machine for dispensing social expression products, and greeting cards in particular, other uses for the present invention are contemplated. A machine represented by the system block diagram of FIG. 2B, for example, may be used to store and retrieve a variety of other products, such as photographs, motion pictures, television programs, musical recordings, gift products, literary works or reference data, or services such as travel services.

Figure 2B:
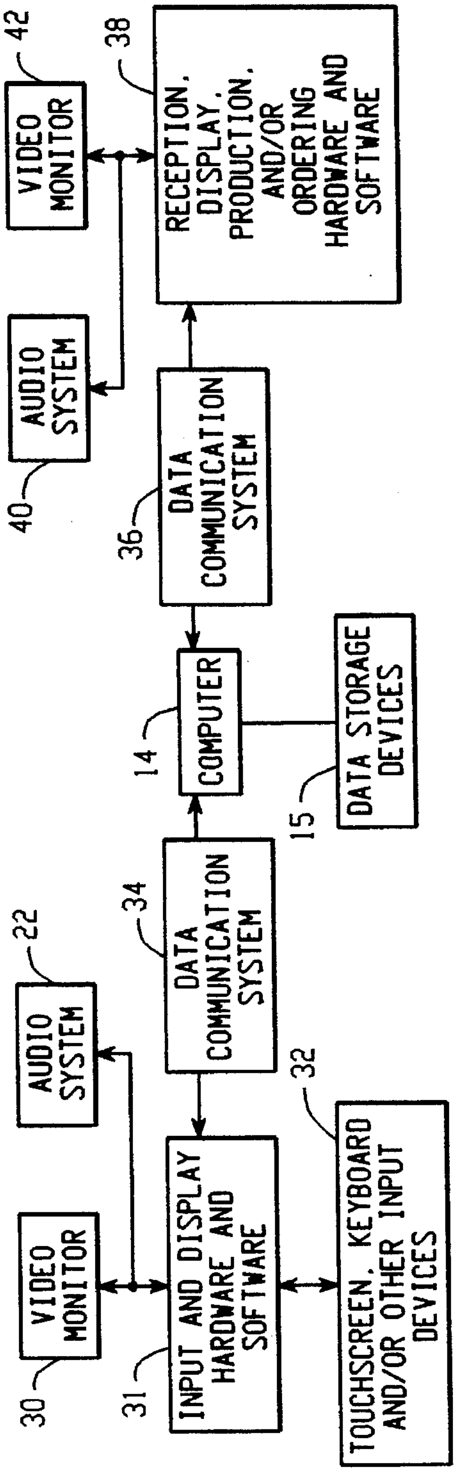
FIG. 2B is a system block diagram of another type of system, not confined to a kiosk, for selecting products or services by correlating customer selection criteria with optimum product and service designs, constructed according to the principles of the present invention.

In addition, the machine represented by the system block diagram of FIG. 2B is not restricted to the on-site storage, retrieval and delivery of these products or services. Accordingly, a machine constructed according to the system block diagram of FIG. 2B includes a first data communications system 34 that is connected between the computer 14 and input and display hardware and software 31, so that the hardware and software 31 and connected video monitor 30, audio system 22 and data input devices 32 may be placed at a location remote from the computer 14 and data storage devices 15. Also, a second data communications system 36 connects the computer 14 to one of a variety of remote reception, display, production and product ordering devices 38. An example of one such device would be the home computer and attached printer of a customer or a recipient to whom the customer wishes to send a product or service, with the video monitor 40 and audio system 42 being the corresponding parts of the home computer of the customer or recipient. Thus, the home computer might receive a data file of a product selected by the customer through an input device 32 located at a retail store. After selecting a product data file at the retail store, the customer could have the file sent to the home computer for storage on an associated data storage device and/or printing on an associated printer.

Alternatively, the input and display hardware and software 31 and input devices 32 could also be parts of the home computer and the video monitors 30 and 42 as well as the audio systems 22 and 40 could be one and the same parts of the home computer. The customer could then send data relating to the kind of product he desires to a remote computer 14 and data storage device 15, which would in turn retrieve data files responsive to those desires and send them back to the customer's computer. The customer would then select the product he wants and, depending on the type of product, either have the product printed on his or some recipient's printer, order the product by E-mail or other transmission means, or if the product is a still or motion picture, have it displayed on his or another recipient's television screen. He could also have the product file stored on a read/write CD-ROM disc or other media for recording pictures and/or sound.

The machine 10 of FIG. 1, designed for the on-site storage, retrieval and delivery of greeting cards, will now be described in detail. The video monitor 30 is preferably a CTX 5468A Super VGA color monitor with a 0.28 dot pitch. Preferably the data input device 32 is a touchscreen that covers the monitor 30. The touchscreen 32 is a transparent, pressure sensitive plate capable of sensing a location where it is touched by a customer. One touchscreen that may be utilized with the present invention is a model E-274 from Elographics Company of Oak Ridge, Tenn.

Preferably, the printer 20 is a Hewlett-Packard 7550B (plus) plotter that is capable of detecting its paper loading status and automatically reloading paper from the paper tray 28 to prepare for the next operation without receiving control instructions from the computer 14. This plotter has a one megabyte RAM upgrade with 70 ns chips and a "B" size card stock loading tray. The printer 20 should also have a four layer plotter control board, an Intel based 12 kHz 8031 micro-controller with a programmable EPROM, a 26 pin DC input/output, and a 7400 based chip set digital logic.

An optional part of the machine 10 is the payment device 24 that is designed to receive money from customers in payment for printed cards. The payment device 24 is connected to the computer 14, which instructs the device 24 concerning the amount of money to collect. The payment device 24 is also connected to the printer 20 and prevents the printer from operating until it has received the amount of money specified by the computer 14. The payment device 24 may include a coin acceptor that has a Model C-120 electronic validator with a standard (S10 compatible) body, available from Coin Controls Inc., 1859 Howard Street, Elk Grove Village, Ill. 60007. The device 24 may also include a Mars VFM4 electronic bill acceptor with an upstacker body, available from Mars Electronics International, 1301 Wilson Drive, West Chester, Pa. 19380. In addition, device 24 may have a vending controller board for accepting credit cards, including a thermal printer, a cutter mechanism and a magnetic stripe reader, per Standard Industries specification dated May 23, 1993, available from Standard Industries, Kontrolle Division, 14250 Gannet Street, La Mirada, Calif. 90638.

The audio system 22 allows the computer 14 to send verbal operating instructions to the customer. The computer 14 may also be equipped to send messages through the speakers to potential customers, encouraging them to use the machine. The audio system 22 preferably includes two speakers, each with a 3 to 4 watt output and equipped with their own individual power supply and a one amp transformer.

The computer 14 displays card designs, card design components and card design criteria on the monitor 30, inviting a customer to make selections. The customer makes selections by pressing the locations of the touchscreen 32 that cover the portions of the monitor 30 that display the desired designs, components and criteria. The touchscreen 32 then sends those selections to the computer 14.

The computer 14 preferably has mini-tower chassis, a 486/33 mhz DX Intel chip upgradable processing system, a 16 megabyte random access memory (RAM) (70 ns), a sound blaster compatible sound board with midi capacity, a Sony internal CD-ROM (CDU-535-01), a Sony bus adapter OPA-461 with a custom "pre-fetch cache" that includes dealer integration of a component level circuit bypass jumper, a Sony custom pre-fetch cache driver, an ATI Mach 32 video accelerator card with a one megabyte Vram, an Elographics touchscreen board, a non bootable 1.44 megabyte Teac or Sony floppy disk drive, a 128 k cache, a 200 watt power supply, three parallel printer ports and two serial printer ports. The computer 14 is preferably loaded with Microsoft DOS 5.0 software and Fastlynx 2.0 transfer software.

The data storage device 15 connected to the computer 14 may include any combination of replaceable, remote, or built-in digital or analog data storage systems. The digital data storage systems may include magnetic disks or tapes, magnetic or electromagnetic storage media, or optical storage media and these storage media may be capable of temporary and/or permanent data storage.

Figure 3:
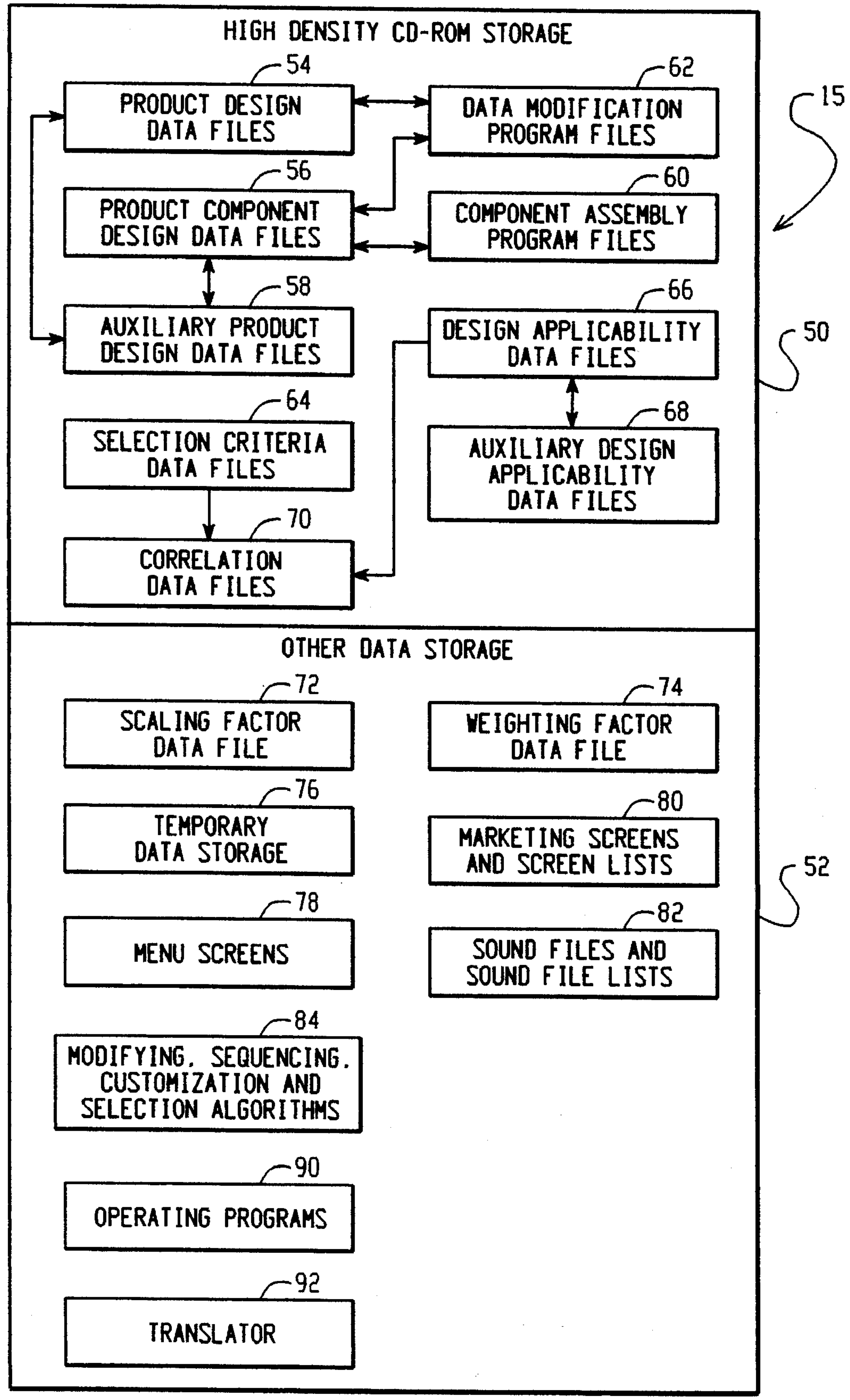
FIG. 3 is a block diagram of the data storage devices shown in the block diagram of FIG. 2A.

As shown in the block diagram of FIG. 3, the data storage device 15 includes a high density storage unit 50 and other data storage 52. The storage unit 50 preferably comprises optical disc devices that use CD-ROM or other high density storage means, which contain product design data files 54, product component design data files 56, auxiliary product design data files 58, component assembly program files 60, and data modification program files 62. The component assembly program files 60 operate to assemble various component designs to form complete products. The data modification program files 62 enable the customer and/or the computer to modify a selected product data file 54 or component data file 56 prior to display or printing.

The files for each product or product component may be duplicated, with one compact version designed for the display of the product on a video monitor and the other designed for printing the product. In addition, the files 54 for displaying complete products may be stored separately from the files 56 for displaying product components, and the printing files may be likewise separated. If the storage device 50 comprises CD-ROM optical disc devices, the product data files 54 and 56 may be changed periodically simply by substituting new discs for old discs. If the CD-ROM memory is of the read-only type, no product data file and or its product code can be changed except by replacing the disc on which it is stored.

The design data files 54, 56, 58 contain all of the information necessary to display or print social expression product designs contained therein. Product codes which identify products and product components are stored in the product design data files 54, the product component design data files 56, and the auxiliary product design data files 58 to identify the product designs contained therein. In the preferred embodiment, the product codes consist of simple alphanumeric character strings. However, they may be titles, names or any other identifying symbols.

The storage unit 50 also includes selection criteria data files 64, design applicability data files 66, auxiliary design applicability data files 68, and correlation data files 70. As explained below, these files are used to (i) store expertly predetermined information relating to the suitability or applicability of given card designs for a variety of customer-dependent situations, (ii) store customer entered criteria, and (iii) correlate the predetermined information with that currently entered by the customer to identify suitable card designs for that customer.

The data storage devices 15 also includes the other data storage 52. Some or all of the data files in the unit 52 may be stored on the same CD-ROM discs that contain the product data, on other CD-ROM discs, or on other types of data storage devices, preferably of the high density type. Some of the data files in the unit 52 may be stored in read/write memory (such as hard drives) to enable appropriate additions, deletions or modifications of data. These various data files include a scaling factor data file 72, a weighting factor data file 74, and temporary data storage 76, as well as menu screens 78, marketing screens and screen lists 80, and sound files and sound file lists 82. Modifying, customizing, sequencing and selection algorithms 84 are also included in the other storage 50. In addition, storage 50 includes operating programs 90 and a translator 92 are further described below.

Many architectural layouts of the high density storage unit 50 are possible, and will be known to those skilled in the art. FIGS. 4 through 7 show in more detail one such layout of the high density storage unit 50, and specifically (i) the design data files 54, 56, 58, shown together in FIG. 4, (ii) the design applicability data files 66 and its auxiliary counterpart 68, shown together as FIG. 6A, (iii) the selection criteria data files 64, shown in FIG. 5A, and (iv) the correlation data files 70, shown in FIG. 7.

B. Storage of Product Designs and Expert-predetermination of Product Design Applicability to a Variety of Customer-dependent Situations The present invention identifies stored product and product component designs suitable for a particular set of customer-dependent circumstances, by correlating (i) descriptive information provided by the customer which characterizes his situation with (ii) expert determinations corresponding to the properties of greeting cards which may relate to that situation.

As shown in FIG. 4, the design data files 54, 56, 58, contain the stored designs of greeting cards and greeting card components. The product codes which identify product and product component designs stored therein are shown simply as the alphanumeric codes aa through zz, although more product and product component designs may be stored if data files 54, 56 and 58 are sufficiently large.

FIG. 5A shows the layout of the selection criteria data file 64. The file 64 is subdivided into a plurality of design applicability dimensions 1-p each of which represents a characteristic associated with social expression products generally, such as sending occasion (e.g. birthday, Valentine's Day), sender characteristics (e.g. teenager, brother), receiver characteristics (e.g. mother, senior citizen), design themes and styles (e.g. love, serious, comical), etc. In this manner, the totality of circumstances involved in the card sending occasion is classified in terms of dimensions 1-p (see also FIGS. 5B1/5B2).

The dimensions 1-p are stored in the selection criteria data file 64 as informational headers as shown in FIG. 5A. Of course, it is contemplated that other dimensions besides those listed here or in the later-described example may be defined in the design applicability data files 66, 68. Like the number of product and product component designs stored in the data files 54, 56 and 58, the number of dimensions is limited only by the size of the selection criteria data file 64 and the design applicability data files 66, 68.

The design application dimensions are employed for characterizing the applicability of individual greeting card designs to various customer purposes, tastes, and desires. The number and type of design application dimensions are predetermined by greeting card marketing or creative experts, or by the consensus judgment of a panel of greeting card experts, who customarily create model lines to satisfy needs of customers. Each of the dimensions is scaled to range between some minimum and some maximum value, with descriptive markers indicated at various points along the scale as guidelines for assessing quantitative values. The scaling of the design application dimensions may be also be predetermined by greeting card marketing or creative experts. For example, the dimension "humor content" may have a scale which ranges from 0 to 100 with descriptive markers such as "sorrowful", "no humor", "droll", "funny", and "outrageous" located at specific points along the scale. FIGS. 5B1/5B2 show examples of design application dimensions (e.g. belated birthday, love note, sender/recipient age), scales (e.g. 0–100), and scale markers (e.g. never or possibly for appropriateness of sending occasion dimension, specific age ranges for recipient or sender age dimension, etc.). Although the later-described example shows ranges of between 0 and 100, with higher numbers indicating greater degree of applicability, it is contemplated that other scales, including negative integers, may be implemented. For example, designs which are completely inapplicable could be assigned a scale value of −100.

FIG. 5A shows an example of the scaling characteristic of each dimension. For each dimension a plurality m of descriptive markers is provided along its respective scale. Although each dimension 1-p is shown as having m markers in FIG. 5A, each dimension may have a unique number of markers which need not be equally spaced on the scale. The position of the markers along each scale determines its descriptive marker value (DMV). Thus, expertly predetermined DMVs are provided for each marker in each dimension (DMV 1—1 through DMV p-m in FIG. 5A). The point on a particular dimension scale at which a DMV is positioned represents the value which has been assigned that particular marker irrespective of product design.

FIG. 6A shows the layout of the design applicability data file 66, 68. For each design aa-zz entered into the product design data files 54, 56, an expert-predetermined optimum applicability value (OAV) is assigned to each dimension. The set of these values characterize the applicability of the individual designs aa-zz to various customer purposes, tastes, and desires as defined by the dimensions. The OAVs are quantitative values as measured along the same continuous scales which represent the applicability dimensions. Unlike the DMVs, however, the values assigned OAVs are dependent on the product design aa-zz.

Like the DMVs, the OAVs are predetermined by greeting card marketing or creative experts, who contemplating each design, assign values to indicate where that design should be positioned along each of the application dimension scales to represent its best or optimum applicability. Each card design is reviewed prior to its entry into the system and the optimum applicability of that design is evaluated for each of the occasions, relationships, traits, and preferences represented by the application dimensions. Judgments of optimum applicability thereby take the form of numerical values representing the position along each dimension believed to be most appropriate for the design being evaluated. Multiple positioning is possible in some instances to reflect a range of best applications or multiple bests (see, e.g. dimension 2 for product design aa in FIG. 6A, which dimension is provided with two OAVs).

Accordingly, for each product design aa-zz, the design applicability data file 66, 68 includes an applicability data set of OAVs 1-p. An illustration of various design applicability data sets for ten examples of greeting card designs along 21 dimensions (A-U) is shown in FIG. 6B (FIG. 6C lists summaries of examples of card designs which are stored in the data files and to which the optimum applicability values of FIG. 6B apply). The data sets shown in FIG. 6B are intended to be representative of the ten theoretical designs illustrated in FIG. 6C and stored in the design data files, each having only a single OAV associated with each dimension of application. Each such data set consists of a set of quantitative values which depict the location or locations of a specific product design along each scaled dimension of applicability.

Together, the individual OAVs of the data set for a particular design describe the best applications of that design. As shown in FIG. 6A, these individual OAVs are identified within the design applicability data files by a subscript i-xy, identifying the dimension i and the product design xy to which that value is assigned. The point on a particular dimension scale at which an OAV is positioned represents the appropriateness or applicability of the corresponding product or product design component to the sending situation as defined in part by that dimension. An entire design set of OAVs for a particular card design includes all of the OAVs assigned to position a particular card design along all of its associated dimensions.

C. Customer Selection of Dimension Criterion Options

During operation of the machine 10, a customer is requested to select certain criterion options for each dimension presented, which options define his particular set of circumstances. The options presented to a customer may correspond to the descriptive markers positioned along each dimension scale or may lie between those markers. Each option is assigned a numerical marker value by expert judgment. The querying process is constructed so that customer selected options are translated directly into appropriate marker values by the translator 92 (see FIG. 3) which consists essentially of a table of marker values to be assigned to all allowable customer selected options or data entries. A predetermined translation file may be provided for storing look-up tables for facilitating this translation process.

However, other more complex schemes of translation are contemplated by the present invention. Any set of words or phrases which have meaning for the customer may be displayed as options even though such words do not correspond directly to a scale marker or marker value. Such a complex scheme would rely on expert judgment to translate in advance each possible customer choice into a set of one or more values to be applied to one or more scales representing the application spectrum. Thus, any querying process designed to elicit a useful set of customer selection criteria may be employed. For example, in response to a relationship query, the customer could select the term "loving". In the absence of a "loving" marker on the relationship dimension scale, the option could be translated into values along various other application dimensions, for example, style of endearment, sentiment type, and/or relationship. Response options associated with each query need not be mutually exclusive. Customers may indicate that they would be satisfied if any of several possible needs are fulfilled.

Accordingly, each customer choice of options is identified with one or more design application dimensions, and translated to one or more appropriate marker values on those identified dimensions. These assigned quantitative marker values represent customer preference values which correspond directly to DMVs associated with the customer-selected options.

D. The Correlation Process

The correlation process begins after the querying process has ended, the customer has responded to the set of inquiries representing the dimension options, and a set of corresponding marker values (customer preference values) are assigned to the selected options or data entries and recorded. First, inconsistent or contradictory responses may be displayed for customer clarification and correction (e.g. the customer has selected as options the theme of romantic love and a recipient age of 10). Such potential contradictions would require application of a customer data entry review program, not described herein. Alternatively, contradictory responses may be ignored or allowed to cause a non-homogeneous collection of designs to be displayed at the end of the correlation process. After any inconsistencies or contradictory responses are ignored or clarified, a correlation process is begun in which, for each product design aa-zz, assigned descriptive marker values (DMVs) for each dimension are quantitatively correlated to the expert-defined optimum applicability values (OAVs) corresponding to those dimensions.

An algorithm determines the suitability of product designs for a particular customer by quantitatively correlating each of the descriptive marker values (DMVs) with corresponding expert-predetermined optimum applicability values (OAVs) to calculate an average suitability rating for each of the card designs. Based on the correlation, a subset of product designs are identified wherein the correlation measure is strong (i.e., the correlation calculation reveals a small degree of variance between DMVs and OAVs for that subset of designs). Thus, suitable card designs may be identified from this subset by the customer for selection and possible further modification.

To facilitate the correlation process, a matrix of corresponding preference values (selected DMV values) and OAV values may be constructed as shown in FIG. 7. The OAVs in this file are taken from the design applicability data file (FIG. 6A) and the DMVs are taken from the selection criteria data file (FIG. 5A). Accordingly, practicing the present invention does not require the construction of correlation data file of FIG. 7, because all necessary data is present in the files of FIGS. 5A and 6A. Nonetheless, for ease of explanation, the correlation data file of FIG. 7 is shown.

Corresponding pairs of OAVs and DMVs exist in each dimension which has been identified by the customer as being pertinent to his situation, as evidenced by the selection criteria options chosen. As explained above, selection of a single criterion option by the customer may be identified with more than one dimension. Also, the chosen selection criteria options may be translated into one or more DMV values on those identified dimensions. For example, as shown in FIG. 7, two DMV values ($DMV_{1-2}$ and $DMV_{1-m}$) have been identified by the selected options with dimension 1.

FIGS. 8 and 9 represent algorithms which may be used to correlate the DMV-OAV pairs of FIG. 7, but other algorithms which quantitatively correlate DMVs and OAVs are contemplated. Conceptually, the algorithms of FIGS. 8 and 9 employ a technique for identifying those designs which most closely approximate the requirements specified by the set of customer-entered options. As shown by FIG. 8, a goodness-of-fit ($G.O.F._{aa}$) value is obtained for product design aa by comparing DMVs and OAVs for each dimension option identified by the customer via selected options. The computer calls up the DMV-OAV pairs contained in the correlation data file 70. If no such file is provided, the computer calls up OAV values stored in the design applicability file 66, 68 and the assigned DMV-values (preference values) stored in the selection criteria data file 64.

The computer 14 then calls up the correlation algorithm of FIG. 8 and inputs the values of the DMV/OAV pairs for each dimension in which such pairs exist. In the simplified file contents shown in FIG. 7, DMV/OAV pairs exist for dimension 1, options 2 and m; for dimension 2, option 1; and for dimension p, option 2. Note that dimension 1 will account for two DMV/OAV pairs because two options have been selected. In addition dimension 2 will also account for two DMV/OAV pairs because two OAVs have been previously assigned to that dimension, reflecting the expert judgment that multiple positioning of design aa is appropriate in dimension 2.

Each OAV is subtracted from each corresponding DMV for each DMV-OAV pair. These differences for each option in each dimension are individually squared before being summed with one another. The dimensional fit measure is therefore indifferent to whether differences are positive or negative. However, the dimensional fit is highly sensitive to the absolute magnitude of differences, because it varies exponentially with the difference between each DMV/OAV pair.

The square root of the total sum of squares value is taken, and then averaged over the number of DMV/OAV pairs accounted for in the process. As shown in FIGS. 8 and 9, the denominator of the correlation algorithm represents the averaging function. Thus the $G.O.F._{aa}$ value is obtained. The G.O.F. value is then recalculated for each product design ab-zz, again accounting for the entire set of DMV/OAV pairs. Because the DMV preference values are assigned independently of the product designs, only the OAV values encountered in these subsequent calculations will be different; the preference values will be the same. Accordingly, a G.O.F is calculated for each product design.

FIG. 9 represents an algorithm which influences the G.O.F. rating calculated for each social expression product design based on the additional consideration of weighting factors (WFs) and scaling factors (SFs). As shown in FIG. 9, scaling factors $SF_i$ may be provided for each dimension i. Scaling factors are provided because the OAV value for a particular dimension i is an arbitrarily, though expertly determined, value. Weighting factors $WF_i$ are necessary to properly determine the importance of a particular dimension. For example, the particular sending occasion dimension may be weighted more heavily than, for example, the age of a sender or recipient. The weighting and scaling factors may be additionally be altered to favor the dimensions which contributed the most (and disfavor the dimensions which contributed the least) to the product design ultimately identified by the algorithm.

The weighting and scaling factors for each dimension i may be stored in the scaling factor data files 72 and the weighting factor data files 74, respectively (see FIG. 3). These scaling and weighting factors are retrieved from their respective files at the beginning of the correlation process. The determined OAV/DMVdifferences are multiplied by the scaling factors prior to squaring the differences, and the squared differences are multiplied by the weighting factors prior to summing the squares.

The algorithm may also provide means for adjusting the resulting G.O.F. value for a particular product design downward if it has been determined, based on past machine performance, that the product design is often displayed but not selected by a customer. Various other algorithms that incorporate cumulative or incremental customer selection and non-selection information may be applied to base priority ratings for the purpose of adjusting the ratings upward or downward to reflect actual customer preferences. For example, G.O.F. values for product designs may be adjusted upward or downward based on the time of day.

Other correlation methods which involve calculating or evaluating the strength of relationship or the goodness of fit between customer-entered selection criteria and product design characteristics will be obvious to those skilled in the art, and may be employed in place of the algorithms of FIGS. 8 and 9. The present invention should not be regarded as being limited to the specific correlation algorithms described above.

E. Overview of System Operation

Figure 10:
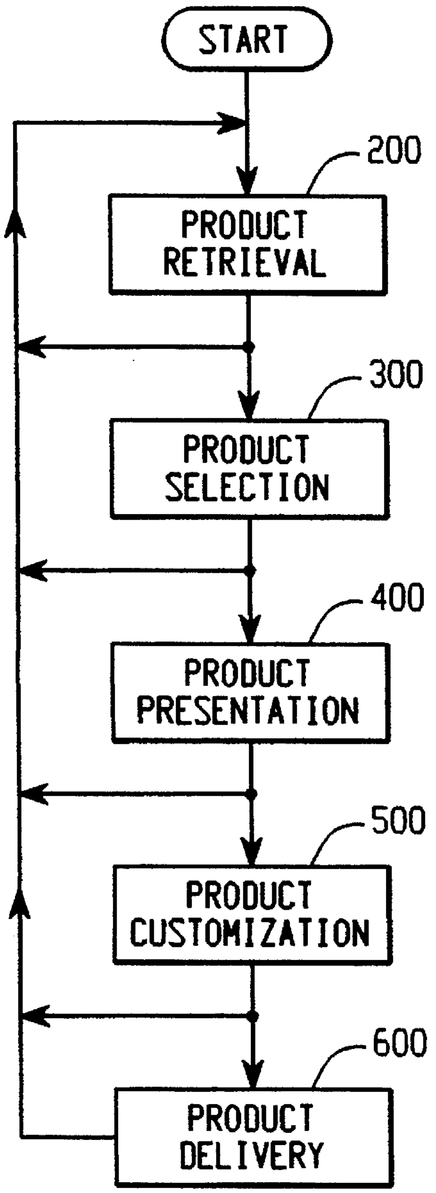
FIG. 10 is a flow chart representing the operating programs stored in the computer residing in the machine of FIG. 1.
Figure 11:
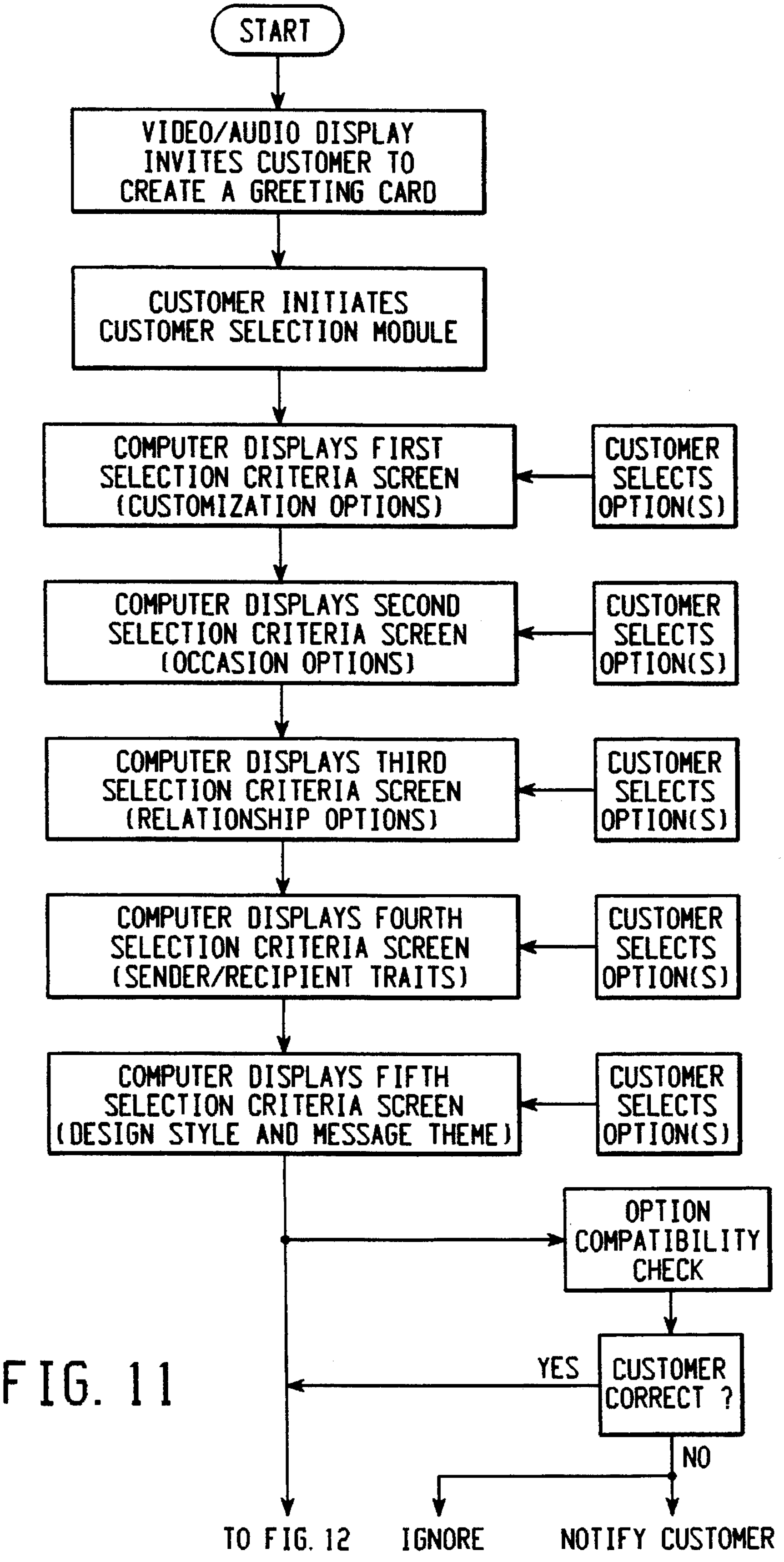
FIGS. 11 and 12 are flow charts representing operation of the machine of FIG. 1 to facilitate customer entry of data, correlation of the entered data with predetermined product design applicability values, and identification of suitable card designs based on the result of the correlation process.
Figure 12:
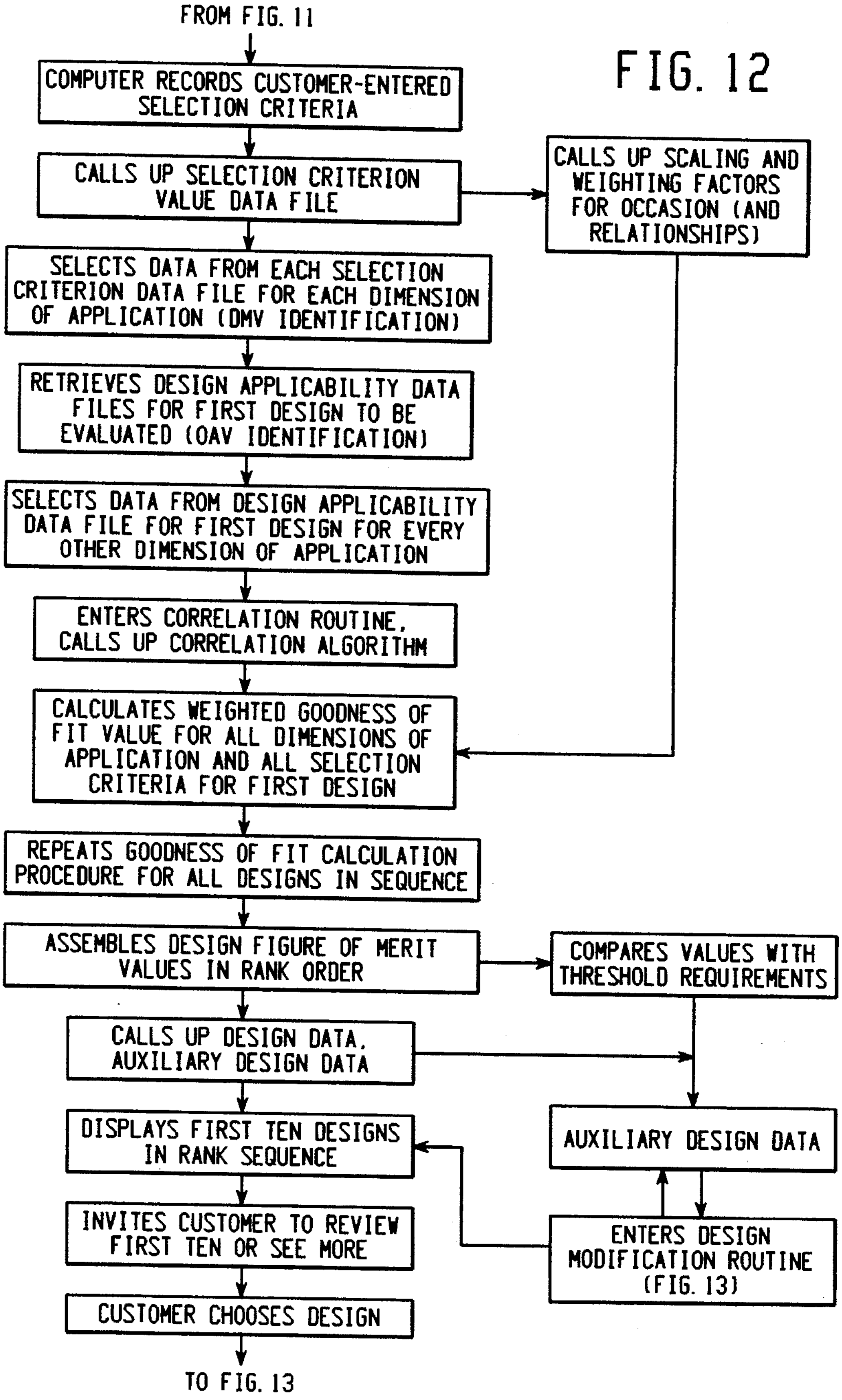
Figure 13:
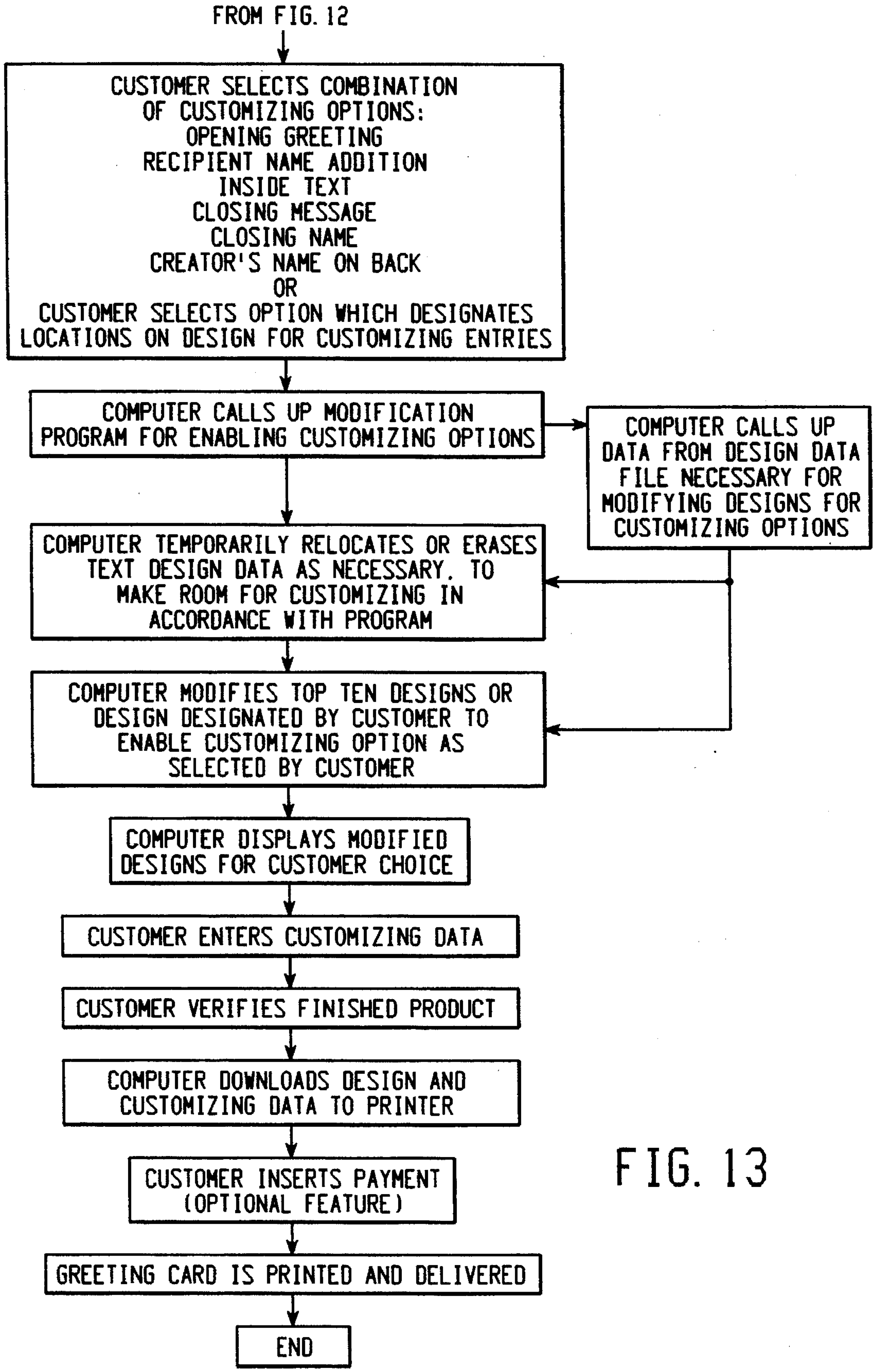
FIG. 13 is a flow chart representing operation of the machine of FIG. 1 to facilitate modification of the suitable card designs identified by the process of FIGS. 11 and 12.

The operation of the machine 10 and the programming of the computer 14 is shown generally in the flow diagram of FIG. 10 and more specifically in the flow diagrams of FIGS. 11–13. Each of the system blocks shown in FIG. 10 represent specific operating programs 90 shown in FIG. 3. As shown in FIG. 10, the machine 10 cycles through various modes of operation, including product retrieval mode 200, product selection mode 300, product presentation mode 400, product customization mode 500, and product delivery mode 600. In each of these modes of operation, the customer is able to return to a previous screen to verify or change selection criteria, product design, or product modifications which have been previously chosen.

Figure 14:
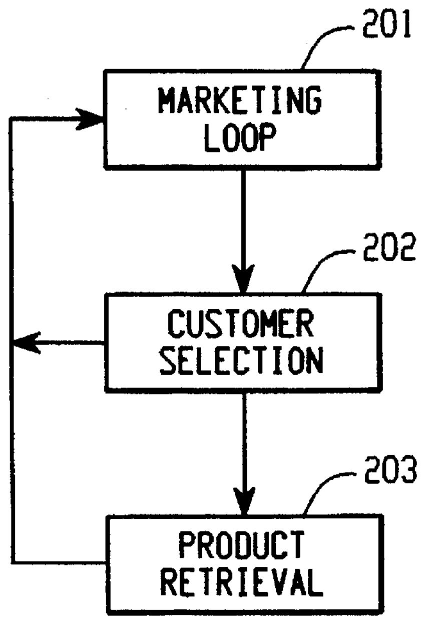
FIG. 14 is a flow chart representing the operation of one of the operating programs of FIG. 10.

As shown in FIG. 14, the product retrieval mode 200 is divided into three main parts, namely a marketing loop 201, a customer selection module 202 and a product retrieval module 203. The marketing loop 201 permits the computer 14 to display the pictures and emit the audio for attracting customers to the machine, presenting them with the kinds of products that they can purchase. The marketing loop includes the marketing menu screens and screen lists (see FIG. 3). The customer selection module 202 includes the display of menu screens to the customer and the entry of criteria by the customer. The product retrieval module 203 includes the programs for correlating expertly predetermined optimal applicability values (OAVs) with customer identified descriptive marker values (DMVs) to identify suitable product designs.

Upon system initialization, the machine is placed in the product retrieval mode 200, and specifically the marketing loop 301. With reference to FIG. 11, the customer initiates the customer selection module 202 by touching an appropriate location on the touchscreen 32. The computer responds by successively presenting a series of menu screens 78 to the customer over the monitor 30 which elicits information from the customer to be input via the touchscreen 32. The video monitor 30 and the touchscreen overlay 32 in combination thereby provide an interactive mechanism which enables the computer to present queries to customers for eliciting responses which relate to customer buying purposes, interests, needs, tastes, and desires. Customers respond by entering specific combinations of selection criteria, or data inputs, into the computer via the touchscreen, which causes the computer to record the choices entered and to store this data in temporary storage 76.

Figure 15:
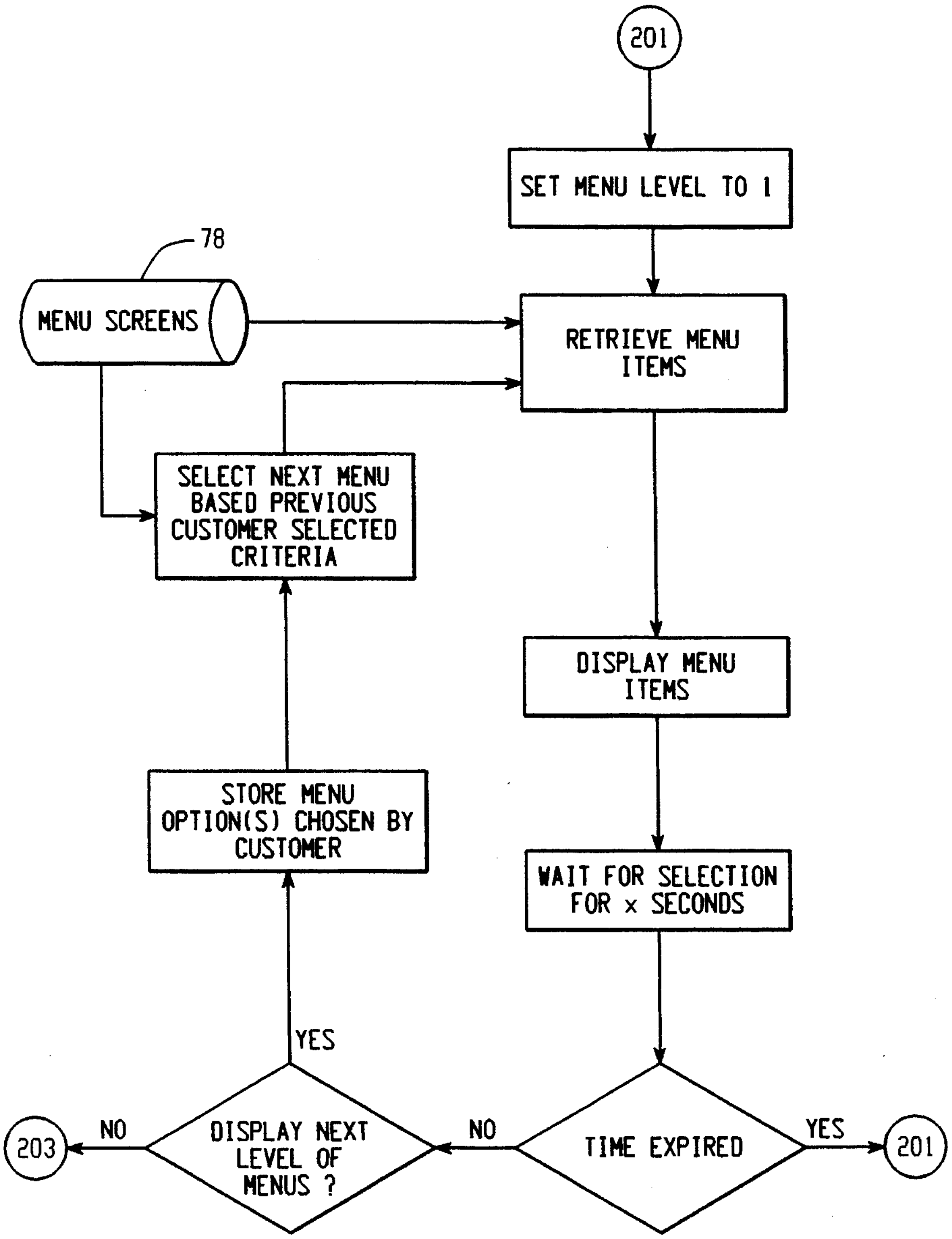
FIG. 15 is a flow chart representing one of the programming modules shown in the flow chart of FIG. 14.

The customer selection module 202 is shown in FIG. 15, and contains programming instructions for displaying various menu screens 78 on the video monitor 32. Each menu screen 72 consists of key words or symbols indicative of various criteria or properties that the customer may wish his product to possess. The customer is asked to choose one or more of the words or symbols by pressing the area of the touchscreen 32 that overlays the desired words or symbols. After the customer makes his selection by pressing the touchscreen 32, the customer selection module 202 retrieves and displays another menu containing a different category of words or symbols.

In the described embodiment of the invention, as shown in FIG. 11, five menus screens are presented to the customer. An example of the content of these screens is shown in FIGS. 16–20, respectively. Each menu screen 78 contains a message that prompts the customer to select one of the categories contained on the menu. After selecting one of these categories by touching the touchscreen 32 in the appropriate place, the next menu is displayed, the content of which may or may not be dependent on the category he has just chosen. The customer selection module 202 (FIG. 15) determines which subsequent menu screen 78 is accessed in response to the customer's previous menu selections. At each stage, the customer is invited to return to some prior stage to alter the selections previously entered. Even after having viewed the initial selection of designs displayed for choice, the customer is invited to return and repeat the query process.

The menu screens 78 may be constructed to present either a series of menu screens, such as those shown in FIGS. 16–20, or a continuous scroll display of product categories and subcategories. Alternatively, a combination of separate menu screens and scroll displays may be presented. In all cases, the menus and scrolls may be controlled by any of a number of available data entry devices, such as touchscreen buttons, a mouse and cursor, a keyboard or even a voice command receiver. Also, the selection of product categories and subcategories on the menu may be controlled by any of these data entry devices. Whatever type of control is used, the customer selection module 202 (FIG. 15) retrieves and displays the selected menus and operates the scrolling screen displays.

The first menu screen which is presented to the customer is that shown in FIG. 16, wherein initially, the customer is presented with four options of which he is to select one. First, the customer may create a card from blank paper stock, in which case the computer will move directly to the customer customizing option sequence of FIG. 13, thereby eliminating all of the selection criteria data entry, correlation process, design data retrieval and downloading to the printer, and instead print the personalized message entered by the customer on blank paper stock.

Second, the customer may want to modify a suitable card, in which case the computer will, if necessary, temporarily delete design data from those designs it retrieves for display to enable implementation of the personalization opportunity requested. Data deletion instructions are carried in the design data files 54, 56, 58. Third, the customer is given the opportunity to complete personalizing information in optional locations which will be designated on the card selected, in which case appropriate words, phrases, and blank spaces where personalizing data may be entered or substituted on the design selected are designated by highlighted, underlined, or flashing markers. Highlighting instruction data are also carried in the design data files 54, 56, 58. After the customer confirms all entries with an appropriate response, both designs and customizing data are downloaded to the printer.

Lastly, within this first menu screen, the customer may choose to review the previous three options once suitable designs have been presented. Upon entering one of these four options, the customer selection module 202 (FIG. 15) retrieves and displays the second menu screen (FIG. 17).

The second through fifth menu screens (FIGS. 17–20) represent four categories of dimensions, and are defined as (i) occasion for sending the social expression product, (ii) sender-receiver relationship, (iii) sender-receiver traits, and (iv) social expression product design themes and styles. The second menu screen presents the customer with a first group of dimensions (A–F) relating to the sending occasion, in which the customer is requested to select only one of the listed occasion dimensions for the entire group of options. Each of the listed options for each of the dimensions is assigned an DMV value of 100 on its associated dimension scale location in the selection criteria data file 64 (refer back to FIG. 5A). Selection of a particular occasion option results in the selection of that corresponding DMV (customer preference value). For example, selection of the regular birthday dimension will assign a DMV value of 100 to the corresponding scale location in dimension A.

Upon selection of a particular sending occasion option in response to the second menu screen, the customer selection module 202 (FIG. 15) retrieves and displays the third menu screen (FIG. 18). Here, the customer is requested to select a particular sender-receiver relationship (second group of dimensions G-I). The descriptive marker values (DMVs) for the dimension scale markers on this screen are shown under the term "criterion values". As shown in FIG. 18, the dimensions G, H, and I represent non-family relationships, family relationships, and special relationships, respectively. Selection of "close friend" for example, will result in an assignment of a DMV value of 40 to the corresponding scale location in dimension G.

Figure 19B:
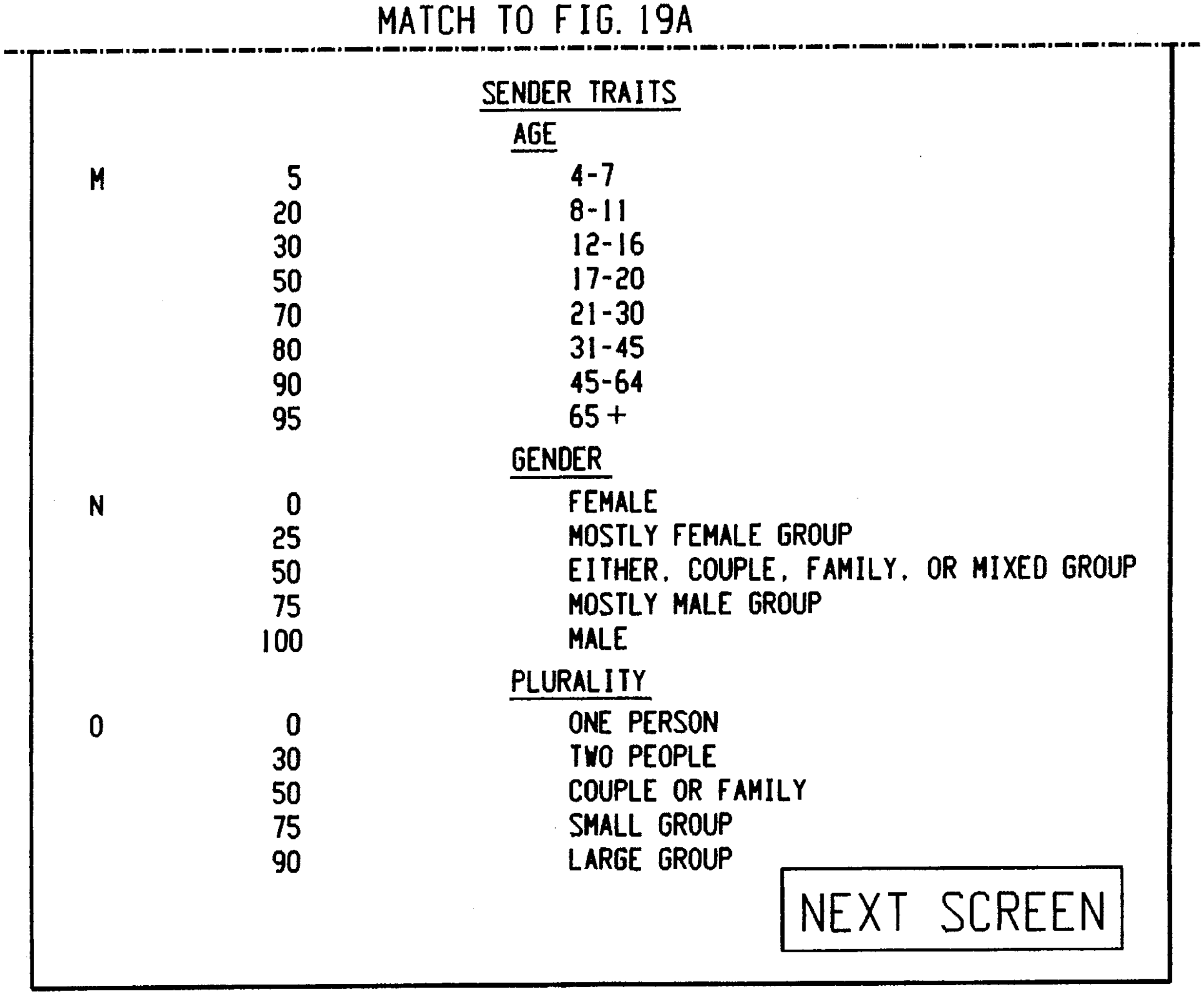

Upon selection of a particular sender-receiver relationship in response to the third menu screen, the customer selection module 202 (FIGS. 15) retrieves and displays the fourth menu screen (FIG. 19A/19B). Here, the customer is requested to select as many sender-receiver traits as he can identify (third group of dimensions J–O). The descriptive marker values (DMVs) for the dimension scale markers are shown under the term "criterion values". As shown in FIGS. 19A/19B, dimensions J, K, and L represent receiver age, gender, and number, respectively, and dimensions M, N, and O represent sender age, gender, and number respectively. Selection of "age=45–64" and "gender=female" for both sender and receiver, for example, will result in the assignment of DMV values of 90 for age and zero for gender at the corresponding scale locations for both sender and receiver in dimensions J, K, M and N.

Figure 20B:
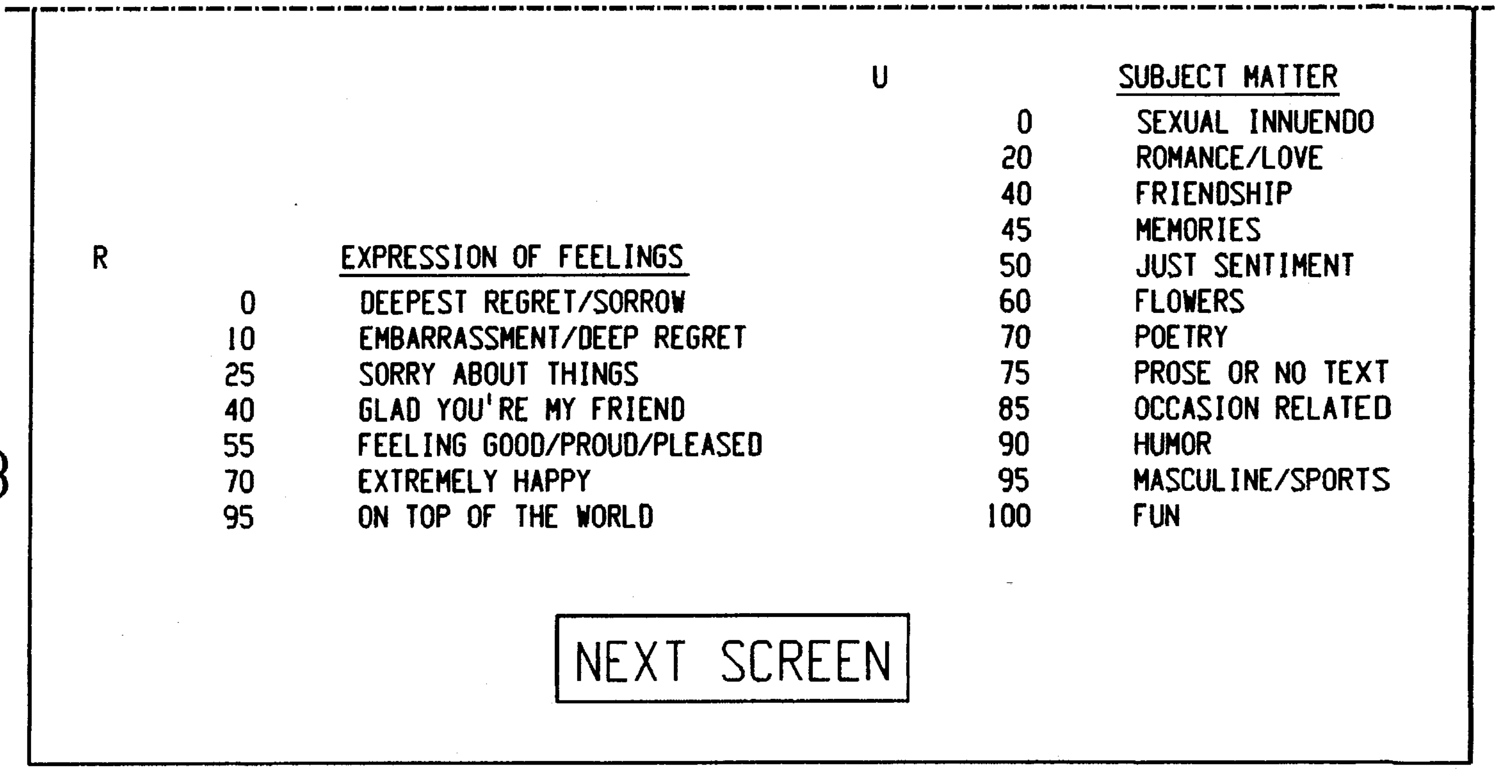

Upon selection of the appropriate sender-receiver traits in response to the fourth menu screen, the customer selection module 202 (FIG. 15) retrieves and displays the fifth menu screen (FIGS. 20A/20B). Here, the customer is requested to select as many greeting card design themes and styles (fourth group of dimensions P–U) as he can identify as applying to his situation. The descriptive marker values (DMVs) for the dimension scale markers are again shown under the term "criterion values".

As shown in FIGS. 20A/20B, dimensions P, Q, R, S, T, and U represent sentiment themes, complimentary qualities, expressions of feelings, humor content, endearment style, and subject matter, respectively. Selection of "warm", "complimentary", "glad you're my friend", "cheerful", "personal" and "memories" for example, will result in the assignment of DMV values of 50, 50, 40, 50, 70, and 45, respectively, to the corresponding dimension scale locations in dimensions P through U.

A simplified set of customer selection screens is shown in FIGS. 21A/21B, wherein screens A–D correspond to the second through fifth screens described above. In this more simplified architecture, specific sub-menus are displayed under more general menus. After the customer makes his selection by pressing the touchscreen 32, the customer selection module 202 (FIG. 15) retrieves and displays the a sub-menu containing words or symbols in an allowable subcategory that forms part of the broader category of the words or symbols of the first menu.

A customer may also choose to respond to fewer than the totality of queries presented in the first through fifth menu screens, implying indifference to those selections passed over. A customer indicates a non-responsive answer to a particular screen by touching the "next screen" instruction presented on the menu screen. The customer selection module 202 (FIG. 15) is programmed under these circumstances to retrieve and display the next menu screen.

It is not necessary that queries and response options be organized hierarchically as a means of enabling only specific, allowable combinations of criteria choices. As shown on the bottom of FIG. 11, the computer 14 may check the compatibility of customer responses and notify the customer if a particular response is not compatible with other choices previously made and repeat the query sequence. Alternatively, the computer may disallow contradictory or unacceptable responses and enter a no-response to a given inquiry, without notifying the customer, or simply ignore the contradictory or unacceptable responses.

Moreover, single criterion options selected by a customer may be translated by the translator 92 (FIG. 3) to more than one scale when such selected criteria do not coincide with a particular dimension option. Therefore, the dimension options selected by a customer do not necessarily need to correspond to one and only one dimension option. As explained above, any set of words or phrases which have meaning to the customer may be displayed as choice options even though such words do not have any direct option value.

Accordingly, once the selection process is complete, the computer has identified DMVs corresponding to the selected criteria and stored these DMVs in the selection criteria data file 64, and system operation continues as indicated in FIG. 12. Scaling factors and weighting factors for the appropriate dimensions are retrieved from the scaling factor data file 72 and the weighting factor data file 74. DMVs are identified from the selection criteria data files 64, and corresponding OAVs are identified from the design applicability data files 66, 68. Alternatively, these corresponding DMV/OAV pairs may be retrieved from the correlation data file 70, having been previously stored therein.

The correlation algorithm of FIG. 9 (including scaling and weighting factors) is called up and goodness of fit (G.O.F.) values are calculated for each product design aa-zz. Illustrative calculations are shown in FIGS. 22A/22B for card designs 1 and 6 listed in FIG. 6C and having the OAVs listed in FIG. 6B, based on the selection criteria identified by the customer above in response to the queries posed by the menu screens 72. As shown in FIG. 6B, dimensions A–U are assigned OAVs for each of these ten card designs. As explained above and shown in FIGS. 17–20, dimensions A–U represent the following design characteristics:

| | | | |
|---|---|---|---|
| A | Regular Birthday | L | Receiver Number |
| B | Belated Birthday | M | Sender Age |
| C | Friendly Greeting | N | Sender Gender |
| D | Love Note | O | Sender Number |
| E | Valentine's Day | P | Sentiment Theme |
| F | Easter | Q | Compliment Type |
| G | Non-family Relation | R | Feelings |
| H | Family Relation | S | Humor Content |
| I | Special Relation | T | Endearment Style |
| J | Receiver Age | U | Subject Matter |
| K | Receiver Gender | | |

FIG. 6B shows a table of values (OAVs) for these dimensions for the ten different illustrative product designs shown in FIG. 6C.

FIGS. 22A/22B show the calculations required using the algorithm of FIG. 9, assuming the same set of responses entered by the customer in describing the first through fifth menu screens above. Accordingly, the scale values listed for customer 1 represent the entire design set of DMV values which have been identified by the customer's selection of dimension criterion options. Scaling factors are also shown in FIGS. 22A/22B as being applicable to dimensions G (2), K (0.5), Q (2), and U (1.5). Weighting factors are shown as being applicable to dimensions G (2), K (1.5), N (1.5), P (3), S (2), and U (0.5).

Based on the DMV set associated with the customer, the weighting and scaling factors associated with dimensions identified by the customer, and the OAV set associated with a particular card design, the algorithm of FIG. 9 may be used to calculate a goodness of fit (G.O.F.) value for each card design. Scaling and weighting factors less than one will lessen the impact of the particular dimension to which they are assigned on the G.O.F. computation, whereas factors greater than one will increase the impact of the particular dimension to which they are assigned on the G.O.F. computation.

As shown in FIGS. 22A/22B, using this data and the correlation algorithm, design 1 of FIG. 6B–6C is shown to have a G.O.F. value of 13.7, and design 6 of FIG. 6B–6C is shown to have a G.O.F. value of 5.2. Based only on these two calculations, it is determined that design 6 is a more appropriate card for this customer because it has the lower G.O.F. value. Although only ten designs are shown in FIG. 6C, in actuality this process is repeated for each and every product design aa-zz.

As shown in the bottom of FIG. 12, the computer then assembles the G.O.F. computed values in order of magnitude and presents the product designs to the customer from lowest-to-highest value. The product designs are called up from the product design and auxiliary product design files. The greeting card having the lowest G.O.F. value represents the product associated with a customer set of DMVs which agree most closely to corresponding OAVs.

A threshold G.O.F value may be established which must be met in order for the computer to display a particular product design. The threshold G.O.F value is compared with the G.O.F. value obtained for a particular design. Products having G.O.F. values exceeding this threshold are not displayed and are assumed to be inappropriate for this particular customer. FIG. 23 shows the computed G.O.F. ranking for all ten product designs listed in FIG. 6C, including those which fall below an arbitrarily-selected suitability threshold of 9.0.

After the customer has examined the displayed product designs in order of G.O.F. ranking, the customer is asked whether he would like to see more product designs or if he would like to again review the displayed product designs. If the customer wishes to view additional designs, the computer presents these designs, again in order of descending applicability. The customer may arrange for miniature versions of displayed designs to be displayed simultaneously to facilitate choice. The process continues until the customer selects a specific design to be customized, personalized, manufactured and delivered.

Once a customer has chosen a design, he has the option to modify the selected design, and the computer proceeds to the customizing option sequence shown by FIG. 13. The customer is permitted to customize specific portions of the card or the customer selects an option which causes the computer to select the locations on the selected design which may be modified. In following this sequence, the computer causes portions of the design data contained in the design data files of selected designs to be highlighted and/or temporarily deleted to make room for any customizing changes required by the customer's choice of specific customizing options.

Potential additions to selected card designs are called up from the product component design data files 56. This data may replace data which has been erased from the chosen design. Additionally, the customer may directly enter data manually, utilizing any of the data entry devices for entering textual or graphic data to provide personalization in any available or designated location on the card. Personalization data entries are displayed at the time they are made for review or alteration.

Once this personalization process is complete, the customer is invited to verify that the card is ready to be printed. Upon verification, the computer downloads all the product data for the retrieved, selected, and modified design to the printer 20 (FIG. 1). The customer is then instructed to pay for his product by means of the payment device 24. Upon receipt of proper payment from the customer, the payment device 24 authorizes the printer to print the card and deliver it to the customer through the bin 26.

Many variations of the system described above are possible, as will become apparent to those skilled in the art. For example, one such variation is to enhance the ability of the machine to identify suitable product designs based on selections made by previous customers. Various elements of operating data associated with each customer use of the machine may be recorded, for example, the customer selection criteria entered, the design characteristic values in memory, the goodness of fit measures calculated for each design displayed for selection, the weighting and scaling factors applied, the rank order of designs displayed, and the designs actually selected of those displayed. These various usage data elements may be stored in memory and periodically retrieved for analysis to provide a basis for altering the weighting factors, the scaling factors, or other elements introduced into the process. Such analysis may also provide a basis for altering the composition of designs stored in the machine's library or for creating new designs to be added.

Figure 24:
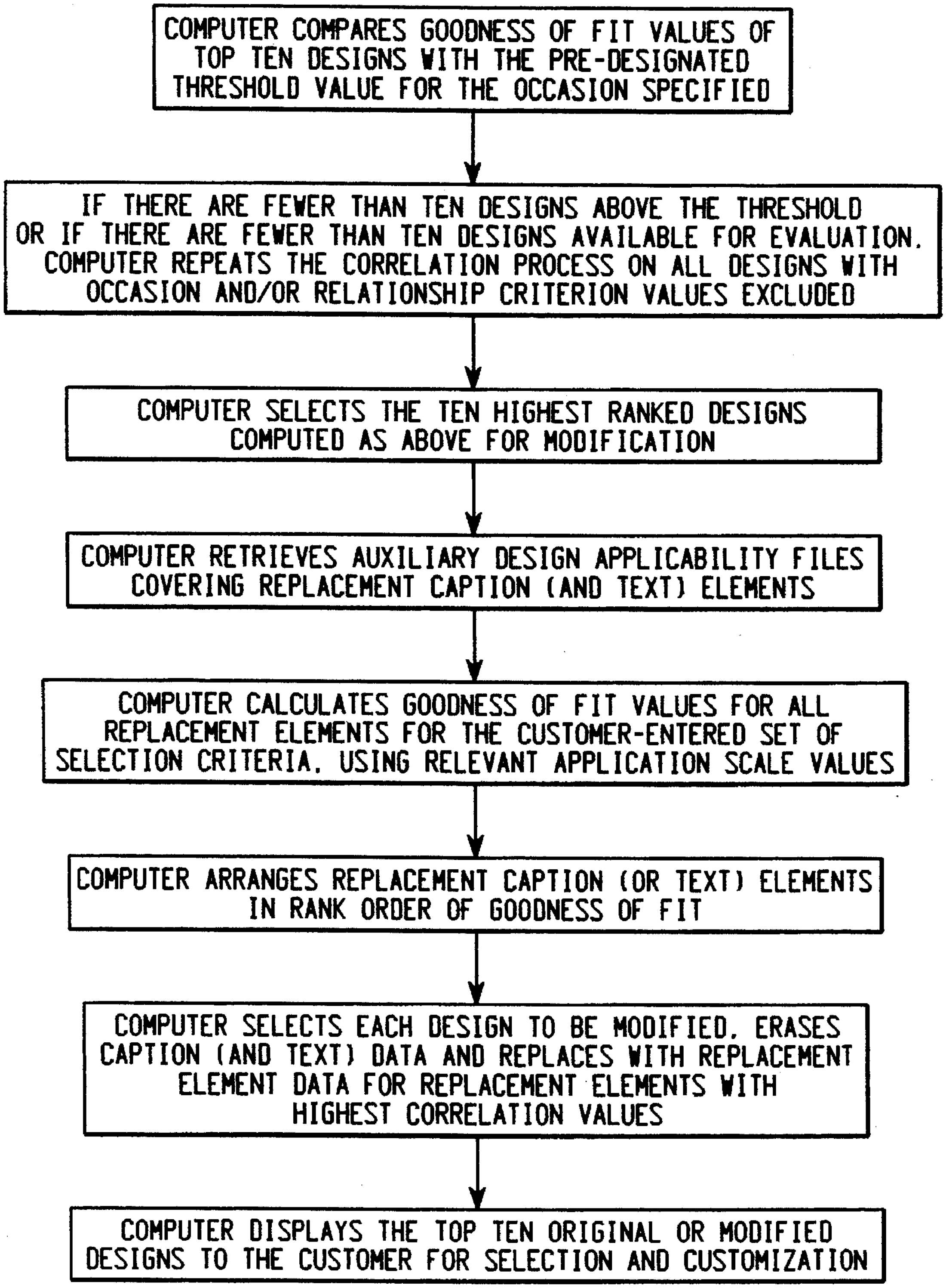
FIG. 24 is a flow chart representing an alternate modification program performed by the machine of FIG. 1 to facilitate modification of the suitable card designs identified by the process of FIGS. 11 and 12.

Another variation is to substitute product design captions or salutations for a particular identified product design, automatically by the computer, to allow designs created for one occasion or application to be temporarily modified to render them suitable for other occasions or applications, as shown in FIG. 24. In this manner, it is possible to identify suitable product designs for a customer even if fewer than ten (and possibly none) of the originally identified designs meets the suitability threshold.

In one particular embodiment, the computer recalculates the G.O.F. values for all product designs eliminating the occasion and/or sender-receiver relationship dimensions. These two dimensions are chosen because, of all dimensions, they most greatly affect the computation of the G.O.F. value for a particular design. The ten most suitable designs identified by this re-computation, which reflect only the remaining customer criterion values, may displayed for the customer to allow the customer to enter modifications.

Alternatively, the next step is to carry out the correlation process again for only the product component designs (i.e. captions or salutations) which represent the dimensions which have been eliminated by the initial correlation process. For this purpose, product components exhibiting dimensions which are too specialized to be stored in the product design data files 54 (e.g. "Happy Birthday" to a "Brother-in-Law") may be stored in the auxiliary product design data files 58. Optimum applicability values for these product components are stored in the auxiliary design applicability data files 68. The correlation process processes DMV/OAV pairs representing the substitution caption and/or text elements contained in the auxiliary product design data file 58, calculates G.O.F. values for these substitution elements, and arranges the substitution elements in order of G.O.F. value.

The computer then deletes corresponding captions/textual elements of the ten product designs originally identified by eliminating the occasion and/or sender-receiver relationship dimensions. These elements are replaced with the substitution elements identified above. The ten originally identified designs, having the substituted portions inserted therein, are then presented to the customer for selection. Thus, by removing captions or inside text created for one occasion and substituting captions or inside text which would make a given product design suitable for another occasion, the range of coverage of the product designs maintained in the product design files is greatly extended.

Accordingly, the preferred embodiment of the present invention has been shown and described. With the foregoing description in mind, however, it is understood that this description is made only by way of example, that the invention is not limited to the particular embodiments described herein, and that various rearrangements, modifications and substitutions may be implemented without departing from the true scope of the invention as hereinafter claimed.

We claim:

1. A method for storing and selectively retrieving product/service data, comprising the steps of:

storing in a design data file a plurality of product/service designs;

storing in a selection criteria data file a plurality of descriptors, each of said descriptors representing an application scale associated with each of said plurality of product/service designs;

storing in a design applicability data file an expert-predetermined optimum applicability value for each combination of said application scales and said product/service designs;

presenting, to a customer, selection criteria options for one or more application scales;

storing in said selection criteria data file customer preference values for one or more application scales used for describing the product/service designs, said customer preference values to be predetermined by expert judgment and assigned to application scales where such values correspond to said selection criteria options chosen by the customer;

quantitatively correlating, by means of a correlation algorithm, each of said customer preference values with corresponding expert-predetermined optimum applicability values to calculate an average suitability rating for each of said product/service designs based on said customer-chosen selection criteria options; and displaying for the customer a group of identified product/service designs based on said average suitability ratings for those identified product/service designs.

2. The method of claim 1, further comprising the steps of (i) requesting the customer to select one of said identified product/service designs and to verify the selection and (ii) displaying said selected product/service design.

3. The method of claim 2, further comprising the step of storing said selected product/service design on a suitable storage medium.

4. The method of claim 2, further comprising the step of printing said selected product/service design and dispensing said printed selected product/service design to the customer.

5. The method of claim 2, further comprising the steps of requesting the customer to modify said selected product/service design and receiving modification instructions from the customer after said selected product/service design is displayed.

6. The method of claim 2, wherein said step of storing customer preference values in said selection criteria data file comprises the steps of translating said selection criteria options chosen by the customer into a plurality of associated application scales and preference values.

7. The method of claim 2, wherein said step of quantitatively correlating said customer preference values with said corresponding expert-predetermined optimum applicability values to calculate an average suitability rating for each of said product/service designs includes the steps of (i) calculating the differences between each pair of said customer preference values and said corresponding expert-predetermined optimum applicability values for each of said application scales in which one or more corresponding pairs exist; (ii) squaring each of the calculated differences; (iii) summing the squared differences; (iv) determining the square root of the summed squared differences to obtain a gross suitability rating, and (v) averaging the gross suitability rating by the number of calculated differences to obtain the average suitability rating.

8. The method of claim 7, wherein said step of quantitatively correlating each of said customer preference values with corresponding expert-predetermined optimum applicability values involves constructing a matrix of corresponding customer preference values and said expert-predetermined optimum applicability values in a correlation data file.

9. The method of claim 7, wherein said customer preference values and said corresponding expert-predetermined optimum applicability values may be assigned either positive or negative values.

10. The method of claim 7, wherein said step of quantitatively correlating said customer preference values with said corresponding expert-predetermined optimum applicability values to calculate an average suitability rating for each of said product/service designs further includes the step of multiplying each of the calculated differences by a scaling factor prior to squaring the calculated differences.

11. The method of claim 7, wherein said step of quantitatively correlating said customer preference values with said corresponding expert-predetermined optimum applicability values on said application scales to calculate an average suitability rating for each of said product/service designs further includes the step of multiplying each of the squared differences by a weighting factor prior to summing the squared differences.

12. The method of claim 7, wherein the differences between each pair of said customer preference values and said corresponding expert-predetermined optimum applicability values are calculated for all but a select group of application scales in which one or more corresponding pairs exist, if said average suitability rating does not meet a predetermined minimum threshold value, and wherein the applicability values of substitute components are retrieved directly from an auxiliary file and employed in subsequent correlation calculations.

13. The method of claim 7, wherein said selection criteria options chosen by the customer do not correspond identically to said application scales.

14. The method of claim 4, further comprising the steps of requesting and verifying payment from the customer prior to printing said selected product/service design and dispensing said printed selected product/service design to the customer.

15. The method of claim 7, wherein said descriptors representing application scales relate to (i) occasion for sending the product/service, (ii) sender-receiver relationship, (iii) sender-receiver traits, and (iv) product/service design themes and styles.

16. The method of claim 7, wherein said step of storing in a design data file a plurality of product/service designs involves the further step of storing in a component design data file a plurality of product/service design components.

17. The method of claim 7, wherein said product/service design is a travel service design.

18. The method of claim 7, wherein said product/service design is a social expression product design.

19. A method for storing and selectively retrieving a social expression product design, comprising the steps of:

storing in a design data file a plurality of social expression product designs;

storing in a selection criteria data file a plurality of descriptors, each of said descriptors representing an application scale associated with each of said plurality of social expression product designs;

storing in a design applicability data file an expert-predetermined optimum applicability value for each combination of said application scales and said social expression product designs;

presenting, to a customer, selection criteria options for one or more application scales;

storing in said selection criteria data file customer preference values for one or more application scales used for describing the social expression product designs, said customer preference values to be predetermined by expert judgment and assigned to application scales where such values correspond to said selection criteria options chosen by the customer;

quantitatively correlating, by means of a correlation algorithm, each of said customer preference values with corresponding expert-predetermined optimum applicability values to calculate an average suitability rating for each of said social expression product designs based on said customer-chosen selection criteria options; and displaying for the customer a group of identified social expression product designs based on said average suitability ratings for those identified social expression product designs.

20. The method of claim 19, further comprising the steps of (i) requesting the customer to select one of said identified social expression product designs and to verify the selection and (ii) displaying said selected social expression product design.

21. The method of claim 20, further comprising the step of storing said selected social expression product design on a suitable storage medium.

22. The method of claim 20, further comprising the step of printing said selected social expression product design and dispensing said printed selected social expression product design to the customer.

23. The method of claim 20, further comprising the steps of requesting the customer to modify said selected social expression product design and receiving modification instructions from the customer after said selected social expression product design is displayed.

24. The method of claim 20, wherein said step of storing customer preference values in said selection criteria data file comprises the steps of translating said selection criteria options chosen by the customer into a plurality of associated application scales and preference values.

25. The method of claim 20, wherein said step of quantitatively correlating said customer preference values with said corresponding expert-predetermined optimum applicability values to calculate an average suitability rating for each of said social expression product designs includes the steps of (i) calculating the differences between each pair of said customer preference values and said corresponding expert-predetermined optimum applicability values for each of said application scales in which one or more corresponding pairs exist; (ii) squaring each of the calculated differences; (iii) summing the squared differences; (iv) determining the square root of the summed squared differences to obtain a gross suitability rating, and (v) averaging the gross suitability rating by the number of calculated differences to obtain the average suitability rating.

26. The method of claim 25, wherein said step of storing in a design data file a plurality of social expression product designs involves the further step of storing in a component design data file a plurality of social expression product design components.

27. The method of claim 25, wherein said customer preference values and said corresponding expert-predetermined optimum applicability values may be assigned either positive or negative values.

28. The method of claim 25, wherein said step of quantitatively correlating said customer preference values with said corresponding expert-predetermined optimum applicability values to calculate an average suitability rating for each of said social expression product designs further includes the step of multiplying each of the calculated differences by a scaling factor prior to squaring the calculated differences.

29. The method of claim 25, wherein said step of quantitatively correlating said customer preference values with said corresponding expert-predetermined optimum applicability values on said application scales to calculate an average suitability rating for each of said social expression product designs further includes the step of multiplying each of the squared differences by a weighting factor prior to summing the squared differences.

30. The method of claim 25, wherein the differences between each pair of said customer preference values and said corresponding expert-predetermined optimum applicability values are calculated for all but a select group of application scales in which one or more corresponding pairs exist, if said average suitability rating does not meet a predetermined minimum threshold value, and wherein the applicability values of substitute components are retrieved directly from an auxiliary file and employed in subsequent correlation calculations.

31. The method of claim 30, wherein said select group of application scales includes a scale representing sending occasion.

32. The method of claim 23, wherein said selection criteria options chosen by the customer do not correspond identically to said application scales.

33. The method of claim 22, further comprising the steps of requesting and verifying payment from the customer prior to printing said selected social expression product design and dispensing said printed selected social expression product design to the customer.

34. The method of claim 23, wherein said descriptors representing application scales relate to (i) occasion for sending the social expression product, (ii) sender-receiver relationship, (iii) sender-receiver traits, and (iv) social expression product design themes and styles.

35. The method of claim 23, wherein said selected social expression product design is stored on a suitable storage medium at a first location and printed at a second remote location.

36. The method of claim 23, wherein said expert-predetermined optimum applicability values are adjusted by the time of day.

37. An apparatus for storing and selectively retrieving product/service data, comprising:

a design data file for storing a plurality of product/service designs;

a selection criteria data file for storing a plurality of descriptors, each of said descriptors representing an application scale associated with each of said plurality of product/service designs;

a design applicability data file for storing an expert-predetermined optimum applicability value for each combination of said application scales and said product/service designs;

a display for presenting, to a customer, selection criteria options for one or more application scales;

means to store in said selection criteria data file customer preference values for one or more application scales used for describing the product/service designs, said customer preference values to be predetermined by expert judgment and assigned to application scales where such values correspond to said selection criteria options chosen by the customer; and a correlation algorithm for quantitatively correlating each of said customer preference values with corresponding expert-predetermined optimum applicability values to calculate an average suitability rating for each of said product/service designs based on said customer-chosen selection criteria options; wherein said display displays for the customer a group of identified product/service designs based on said average suitability ratings for those identified product/service designs.

38. The apparatus of claim 37, wherein said display (i) requests the customer to select one of said identified product/service designs and to verify the selection and (ii) displays said selected product/service design.

39. The apparatus of claim 38, further comprising a suitable storage medium on which said selected product/service design may be stored.

40. The apparatus of claim 38, further comprising a printer for printing said selected product/service design and a dispenser for dispensing said printed selected product/service design to the customer.

41. The apparatus of claim 38, further comprising means for requesting the customer to modify said selected product/service design and means for receiving modification instructions from the customer after said selected product/service design is displayed.

42. The apparatus of claim 38, further comprising means for translating said selection criteria options chosen by the customer into a plurality of associated application scales and preference values.

43. The apparatus of claim 38, wherein said correlation algorithm (i) calculates the differences between each pair of said customer preference values and said corresponding expert-predetermined optimum applicability values for each of said application scales in which one or more corresponding pairs exist; (ii) squares each of the calculated differences; (iii) sums the squared differences; (iv) determines the square root of the summed squared differences to obtain a gross suitability rating, and (v) averages the gross suitability rating by the number of calculated differences to obtain the average suitability rating.

44. The apparatus of claim 43, further comprising means for constructing a matrix of corresponding customer preference values and said expert-predetermined optimum applicability values in a correlation data file.

45. The apparatus of claim 43, wherein said customer preference values and said corresponding expert-predetermined optimum applicability values may be assigned either positive or negative values.

46. The apparatus of claim 43, wherein said correlation algorithm additionally multiplies each of the calculated differences by a scaling factor prior to squaring the calculated differences.

47. The apparatus of claim 43, wherein said correlation algorithm additionally multiplies each of the squared differences by a weighting factor prior to summing the squared differences.

48. The apparatus of claim 40, wherein the differences between each pair of said customer preference values and said corresponding expert-predetermined optimum applicability values are calculated for all but a select group of application scales in which one or more corresponding pairs exist, if said average suitability rating does not meet a predetermined minimum threshold value, and wherein the applicability values of substitute components are retrieved directly from an auxiliary file and employed in subsequent correlation calculations.

49. The apparatus of claim 41, wherein said selection criteria options chosen by the customer do not correspond identically to said application scales.

50. The apparatus of claim 40, further comprising a payment mechanism for requesting and verifying payment from the customer prior to printing said selected product/service design and dispensing said printed selected product/service design to the customer.

51. The apparatus of claim 41, wherein said descriptors representing application scales relate to (i) occasion for sending the product/service, (ii) sender-receiver relationship, (iii) sender-receiver traits, and (iv) product/service design themes and styles.

52. The apparatus of claim 41, further comprising a component design data file in which is stored a plurality of product/service design components.

53. The apparatus of claim 41, wherein said product/service design is a travel service design.

54. The apparatus of claim 41, wherein said product/service design is a social expression product design.

55. An apparatus for storing and selectively retrieving a social expression product design, comprising:

a design data file for storing a plurality of social expression product designs;

a selection criteria data file for storing a plurality of descriptors, each of said descriptors representing an application scale associated with each of said plurality of social expression product designs;

a design applicability data file for storing an expert-predetermined optimum applicability value for each combination of said application scales and said social expression product designs;

a display for presenting, to a customer, selection criteria options for one or more application scales;

means to store in said selection criteria data file customer preference values for one or more application scales used for describing the social expression product designs, said customer preference values predetermined by expert judgment and assigned to application scales where such values correspond to said selection criteria options chosen by the customer;

a correlation algorithm for quantitatively correlating each of said customer preference values with corresponding expert-predetermined optimum applicability values to calculate an average suitability rating for each of said social expression product designs based on said customer-chosen selection criteria options; wherein said display displays for the customer a group of identified social expression product designs based on said average suitability ratings for those identified social expression product designs.

56. The apparatus of claim 55, wherein said display (i) requests the customer to select one of said identified social expression product designs and to verify the selection and (ii) displays said selected social expression product design.

57. The apparatus of claim 56, further comprising a suitable storage medium for storing said selected social expression product design.

58. The apparatus of claim 56, further comprising a printer for printing said selected social expression product design and a dispenser for dispensing said printed selected social expression product design to the customer.

59. The apparatus of claim 56, further comprising means for requesting the customer to modify said selected social expression product design and means for receiving modification instructions from the customer after said selected social expression product design is displayed.

60. The apparatus of claim 56, further comprising means for translating said selection criteria options chosen by the customer into a plurality of associated application scales and preference values.

61. The apparatus of claim 56, wherein said correlation algorithm (i) calculates the differences between each pair of said customer preference values and said corresponding expert-predetermined optimum applicability values for each of said application scales in which one or more corresponding pairs exist; (ii) squares each of the calculated differences; (iii) sums the squared differences; (iv) determines the square root of the summed squared differences to obtain a gross suitability rating, and (v) averages the gross suitability rating by the number of calculated differences to obtain the average suitability rating.

62. The apparatus of claim 61, further comprising a component design data file in which is stored a plurality of social expression product design components.

63. The apparatus of claim 61, wherein said customer preference values and said corresponding expert-predetermined optimum applicability values may be assigned either positive or negative values.

64. The apparatus of claim 61, wherein said correlation algorithm additionally multiplies each of the calculated differences by a scaling factor prior to squaring the calculated differences.

65. The apparatus of claim 61, wherein said correlation algorithm additionally multiplies each of the squared differences by a weighting factor prior to summing the squared differences.

66. The apparatus of claim 61, wherein the differences between each pair of said customer preference values and said corresponding expert-predetermined optimum applicability values are calculated for all but a select group of application scales in which one or more corresponding pairs exist, if said average suitability rating does not meet a predetermined minimum threshold value, and wherein the applicability values of substitute components are retrieved directly from an auxiliary file and employed in subsequent correlation calculations.

67. The apparatus of claim 66, wherein said select group of application scales includes a scale representing sending occasion.

68. The apparatus of claim 67, wherein said selection criteria options chosen by the customer do not correspond identically to said application scales.

69. The apparatus of claim 58, further comprising a payment mechanism for requesting and verifying payment from the customer prior to printing said selected social expression product design and dispensing said printed selected social expression product design to the customer.

70. The apparatus of claim 59, wherein said descriptors representing application scales relate to (i) occasion for sending the social expression product, (ii) sender-receiver relationship, (iii) sender-receiver traits, and (iv) social expression product design themes and styles.

71. The apparatus of claim 59, wherein said selected social expression product design is stored on a suitable storage medium at a first location and printed at a second remote location.

72. The apparatus of claim 59, wherein said expert-predetermined optimum applicability values are adjusted by the time of day.

* * * * *